United States Patent
Hanatani et al.

(10) Patent No.: US 10,454,910 B2
(45) Date of Patent: Oct. 22, 2019

(54) MANAGEMENT APPARATUS, COMPUTER PROGRAM PRODUCT, SYSTEM, DEVICE, METHOD, INFORMATION PROCESSING APPARATUS, AND SERVER

(71) Applicant: Kabushiki Kaisha Toshiba, Minato-ku (JP)

(72) Inventors: Yoshikazu Hanatani, Komae (JP); Yoshihiro Oba, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 220 days.

(21) Appl. No.: 15/448,131

(22) Filed: Mar. 2, 2017

(65) Prior Publication Data
US 2017/0180338 A1    Jun. 22, 2017

Related U.S. Application Data

(63) Continuation of application No. PCT/JP2015/058908, filed on Mar. 24, 2015.

(51) Int. Cl.
*H04L 29/06* (2006.01)
*H04L 9/08* (2006.01)
(Continued)

(52) U.S. Cl.
CPC .......... *H04L 63/065* (2013.01); *H04L 9/0833* (2013.01); *H04L 63/0428* (2013.01);
(Continued)

(58) Field of Classification Search
CPC .............. H04L 63/065; H04L 63/0869; H04L 63/0823; H04L 63/0428; H04L 9/0833; G06F 21/60
See application file for complete search history.

(56) References Cited

U.S. PATENT DOCUMENTS

2006/0220790 A1   10/2006 Doi et al.
2007/0143600 A1*   6/2007 Kellil ................... H04L 9/0822
                                             713/163
(Continued)

FOREIGN PATENT DOCUMENTS

JP    2006-134479      5/2006
JP    2006-270185     10/2006
(Continued)

OTHER PUBLICATIONS

International Search Report dated Jun. 16, 2015 in PCT/JP2015/058908, filed on Mar. 24, 2015( with English Translation).
(Continued)

*Primary Examiner* — Brandon S Hoffman
*Assistant Examiner* — William A Corum, Jr.
(74) *Attorney, Agent, or Firm* — Oblon, McClelland, Maier & Neustadt, L.L.P.

(57) ABSTRACT

According to an embodiment, a management apparatus manages pieces of information held by a plurality of devices. The apparatus includes storage, one or more processors, and a transmitter. The storage stores therein the pieces of information held by the devices. The processors generate a list of inspection values indicating the pieces of information stored in the storage. The processors generate determination information for determining, in a state where the list is concealed, whether a provided value is included in the list. The transmitter transmits the determination information to the respective devices.

19 Claims, 25 Drawing Sheets

(51) Int. Cl.
*G06F 21/44* (2013.01)
*G06F 21/62* (2013.01)
(52) U.S. Cl.
CPC ...... *H04L 63/0823* (2013.01); *H04L 63/0869* (2013.01); *G06F 21/445* (2013.01); *G06F 21/6218* (2013.01)

(56) References Cited

U.S. PATENT DOCUMENTS

| | | |
|---|---|---|
| 2008/0212111 A1 | 9/2008 | Masuda |
| 2008/0313132 A1* | 12/2008 | Hao ........................ H04L 45/00 |
| 2010/0077204 A1* | 3/2010 | Kawano .............. H04L 63/0428 |
| | | 713/153 |
| 2010/0208898 A1* | 8/2010 | Acar ..................... H04L 9/0833 |
| | | 380/280 |
| 2012/0311686 A1 | 12/2012 | Medina et al. |
| 2013/0031367 A1 | 1/2013 | Mao et al. |
| 2013/0107882 A1* | 5/2013 | Hirai ...................... H04L 12/18 |
| | | 370/390 |
| 2013/0142336 A1* | 6/2013 | Fries .................... H04L 9/0825 |
| | | 380/278 |
| 2013/0208893 A1* | 8/2013 | Shablygin ............. H04L 9/0822 |
| | | 380/277 |
| 2014/0325599 A1* | 10/2014 | Everhart ............... H04L 63/104 |
| | | 726/4 |
| 2014/0373118 A1* | 12/2014 | Doi ....................... H04L 9/3268 |
| | | 726/6 |

FOREIGN PATENT DOCUMENTS

| | | |
|---|---|---|
| JP | 2008-217340 | 9/2008 |
| JP | 2014-525106 | 9/2014 |

OTHER PUBLICATIONS

Written Opinion dated Jun. 16, 2015 in PCT/JP2015/058908, filed on Mar. 24, 2015.
Burton H. Bloom "Space /Time Trade-offs in Hash Coding with Allowable Errors," Communications of the ACM, vol. 13, No. 7, Jul. 1970, pp. 5.
"IEEE Standard for Local and metropolitan area networks—Media Independent Handover Services," IEEE 802.21d-2008, 2015, pp. 106.

* cited by examiner

FIG.4

| DEVICE IDENTIFIER | DEVICE KEYS |
|---|---|
| A | K1, K2, K4, K8 |
| B | K1, K2, K4, K9 |
| C | K1, K2, K5, K10 |
| D | K1, K2, K5, K11 |
| E | K1, K3, K6, K13 |
| F | K1, K3, K7, K15 |

FIG.5

| GROUP IDENTIFIER | GROUP KEY | DEVICE IDENTIFIERS |
|---|---|---|
| $\alpha$ | GK$\alpha$ | A, B |
| $\beta$ | GK$\beta$ | A, B, C, D |
| $\gamma$ | GK$\gamma$ | E, F |

FIG.9

DEVICE LIST $X_1 = (A, K1)$
$X_2 = (A, K2)$
$X_3 = (A, K4)$
$X_4 = (A, K8)$
$X_5 = (B, K1)$
⋮

FIG.10

DEVICE LIST $X_1 = (A, K1, K2, K4, K8)$
$X_2 = (B, K1, K2, K4, K9)$
⋮

FIG.11

GROUP LIST $Y_1 = (\alpha, GK\alpha, A)$
$Y_2 = (\alpha, GK\alpha, B)$
$Y_3 = (\beta, GK\beta, A)$
$Y_4 = (\beta, GK\beta, B)$
$Y_5 = (\beta, GK\beta, C)$
$Y_6 = (\beta, GK\beta, D)$
$Y_7 = (\gamma, GK\gamma, E)$
$Y_8 = (\gamma, GK\gamma, F)$
⋮

FIG.12

GROUP LIST $Y_1 = (A, (\alpha, GK\alpha), (\beta, GK\beta))$
$Y_2 = (B, (\alpha, GK\alpha), (\beta, GK\beta))$
$Y_3 = (C, (\beta, GK\beta))$
$Y_4 = (D, (\beta, GK\beta))$
$Y_5 = (E, (\gamma, GK\gamma))$
$Y_6 = (F, (\gamma, GK\gamma))$
⋮

MANAGEMENT APPARATUS, COMPUTER PROGRAM PRODUCT, SYSTEM, DEVICE, METHOD, INFORMATION PROCESSING APPARATUS, AND SERVER

CROSS-REFERENCE TO RELATED APPLICATIONS

This application is a continuation of PCT international application Ser. No. PCT/JP2015/058908 filed on Mar. 24, 2015 which designates the United States; the entire contents of which are incorporated herein by reference.

FIELD

Embodiments described herein relate generally to a management apparatus, a computer program product, a system, a device, a method, an information processing apparatus, and a server.

BACKGROUND

Management apparatuses adopt a method of distributing a group key to a plurality of devices, to manage the devices for each group. The management apparatus encrypts the group key with device keys distributed in advance to the devices, and transmits the group key. The management apparatus shares the device keys with the devices using, for example, an authenticated key exchange protocol.

For example, when hardware of the management apparatus is changed, the management authority is required to be transferred from the original management apparatus to a new management apparatus. To transfer the management authority, management information such as the device keys and the group keys held by the original management apparatus should be moved to the new management apparatus. However, in related art, because the new management apparatus is not capable of checking whether the received management information is right information, the management authority cannot be transferred by moving the management information. Accordingly, in related art, the new management apparatus is required to share new device keys with respective devices using an authenticated key exchange protocol or the like, to transfer the management authority. This process requires an enormous processing quantity.

BRIEF DESCRIPTION OF THE DRAWINGS

FIG. 4 is a diagram illustrating an example of device information;
FIG. 5 is a diagram illustrating an example of group information;
FIG. 9 is a diagram illustrating a first example of a device list;
FIG. 10 is a diagram illustrating a second example of the device list;
FIG. 11 is a diagram illustrating a first example of a group list;
FIG. 12 is a diagram illustrating a second example of the group list.

DETAILED DESCRIPTION

According to an embodiment, a management apparatus manages pieces of information held by a plurality of devices. The apparatus includes storage, one or more processors and a transmitter. The storage stores therein the pieces of information held by the devices. The processors generate a list of inspection values indicating the pieces of information stored in the storage. The processors generate determination information for determining, in a state where the list is concealed, whether a provided value is included in the list. The transmitter transmits the determination information to the respective devices.

A communication system according to an embodiment will be explained hereinafter in detail with reference to drawings. The communication system according to the present embodiment is capable of simply checking whether management information moved from a first management apparatus to a second management apparatus is right, and enables easy execution of transfer of management authority from the first management apparatus to the second management apparatus.

First Embodiment

Figure 1:
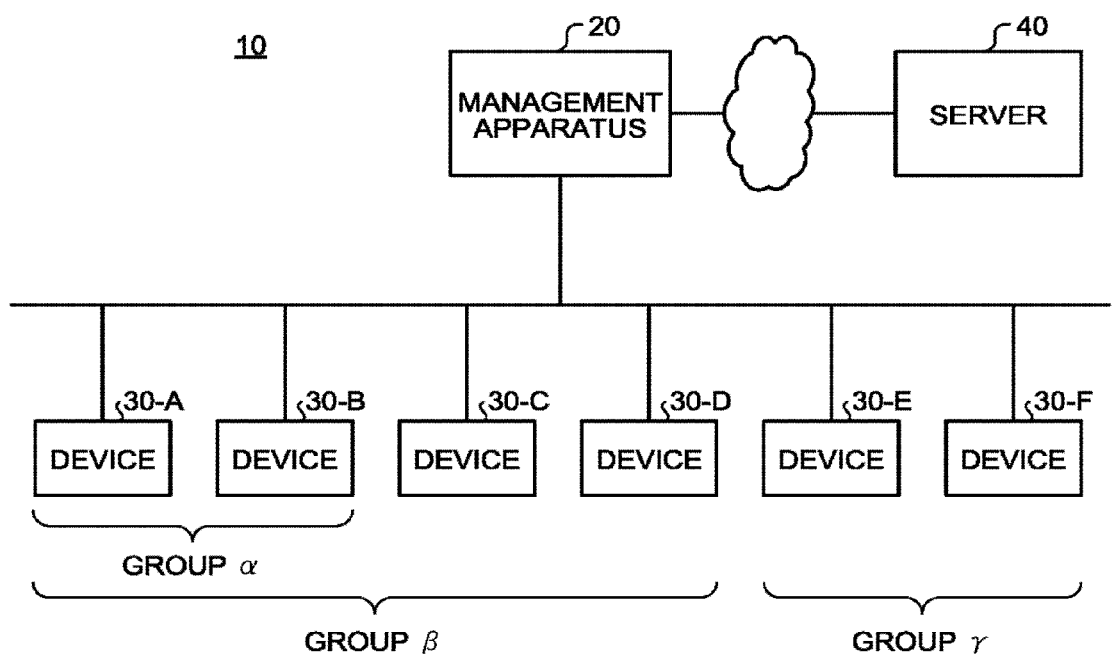
FIG. 1 is a block diagram of a communication system according to a first embodiment.

FIG. 1 is a diagram illustrating a configuration of a communication system 10 according to a first embodiment. The communication system 10 includes a management apparatus 20, a plurality of devices 30 (30-A to 30-F), and a server 40. The management apparatus 20 and the device 30 are mutually connectable via a network. The network is, for example, a local area network (LAN) formed at home. The network may include the Internet or a public network such as a virtual private network (VPN). The management apparatus 20 and the server 40 are also mutually connectable via the network.

The management apparatus 20 is an information processing apparatus such as a computer. The management apparatus 20 executes a predetermined program on an operating system, and, for example, is always activated.

The devices 30 are apparatuses having a communication function and an information processing function. For example, the devices 30 may be home appliances (for example, air conditioners, television sets, and refrigerators that are connectable to a network). The devices 30 may be portable information devices such as smartphones, tablet computers, and notebook computers.

In the communication system 10, data is transmitted between the management apparatus 20 and a device 30, or between a device 30 and a device 30. Examples of the data transmitted in the communication system 10 include control commands for controlling the operation of devices 30, moving image data, sound data, text data, and computer program codes.

The devices 30 hold device keys and group keys. The management apparatus 20 manages the device keys and the group keys held by the devices 30.

The group key is a key held in common by the devices 30 belonging to a group. A plurality of groups may exist in the communication system 10. In addition, a device 30 may belong to a plurality of groups. The management apparatus 20 encrypts data with such a group key, to allow a device 30 belonging to the group to acquire the data and conceal the data from a device 30 not belong to the group.

The management apparatus 20 also encrypts the group key with a device key assigned to a device 30, and transmits the group key to the device 30. The device key is a key shared between the management apparatus 20 and a device 30. One device 30 holds at least one device key. The management apparatus 20 shares the device key with a device 30 by performing mutual authentication and a key sharing process by an RFC 5191 method or the like.

The server 40 is an information processing apparatus disposed on the network. The server 40 acquires and stores therein information from the devices 30 on the network, and provides information to the devices 30 on the network. The server 40 may be a system providing a cloud service or the like on the Internet.

Figure 2:
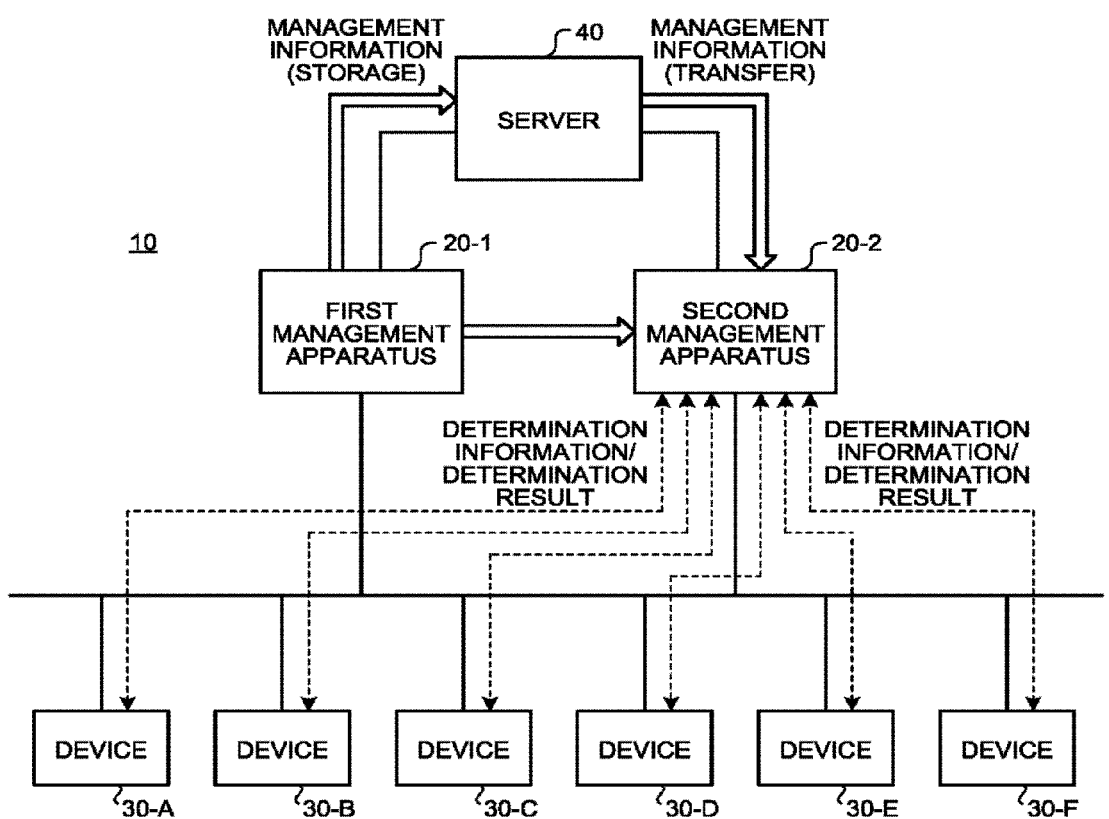
FIG. 2 is a diagram illustrating a flow of a process in the case where management authority is transferred.

FIG. 2 is a diagram illustrating a flow of process in the case where management authority is transferred. In the communication system 10, management authority of a management apparatus 20 is transferred to a new management apparatus 20. The management apparatus 20 serving as a transfer source is referred to as a first management apparatus 20-1. The management apparatus 20 serving as a transfer destination is referred to as a second management apparatus 20-2.

In the communication system 10 according to the present embodiment, management information managed by the first management apparatus 20-1 is transmitted to the second management apparatus 20-2 through the server 40, to transfer management authority. The management information (first information) is information for identifying devices 30 included in the group. For example, the management information includes at least one of device information and group information. The device information includes pieces of information individually held by the respective devices 30 belonging to the group, and the group information includes information held in common by the devices 30 belonging to the group. Each piece of device information is information for receiving the group key by the device 30. For example, each piece of device information is a device key for receiving, by the device 30, the group key to acquire communication contents addressed to the group. The device information may be information other than a device key. The group information is information for receiving, by the device 30, communication contents addressed to the group. For example, the group information is a group key for acquiring, by the device 30, communication contents addressed to the group. The group information may be information other than a group key.

When the management authority is transferred from the first management apparatus 20-1 to the second management apparatus 20-2 via the server 40, first, the first management apparatus 20-1 transmits management information to the server 40 connected through the network, to cause the server 40 to store therein the management information. The server 40 temporarily stores therein the management information received from the first management apparatus 20-1. Thereafter, the server 40 transmits the management information received from the first management apparatus 20-1 to the second management apparatus 20-2.

Thereafter, the second management apparatus 20-2 generates determination information based on the received management information, and transmits the determination information to each of the devices 30. The determination information is data (information) that can be transmitted through the network, to execute determination process in cooperation with a processor such as a central processing unit (CPU) and other hardware. In the present embodiment, the determination information is a bloom filter. Instead of a bloom filter, the determination information may be computer program codes or an automaton outputting a determination result when provided with an input value.

The device 30 receives determination information. The device 30 determines the information held by the device 30 itself using the determination information, and transmits a determination result to the second management apparatus 20-2.

The second management apparatus 20-2 receives determination results obtained by executing the determination in the respective devices 30 using the determination information, from the respective devices 30. The second management apparatus 20-2 checks whether management information received from the server 40 is right, based on the determination results received from the respective devices 30, and finishes transfer when the second management apparatus 20-2 determines that the management information is right.

Because the communication system 10 checks whether the delivered management information is right using determination information, the management authority is enabled to be safely transferred from the first management apparatus 20-1 to the second management apparatus 20-2 via the server 40.

Figure 3:
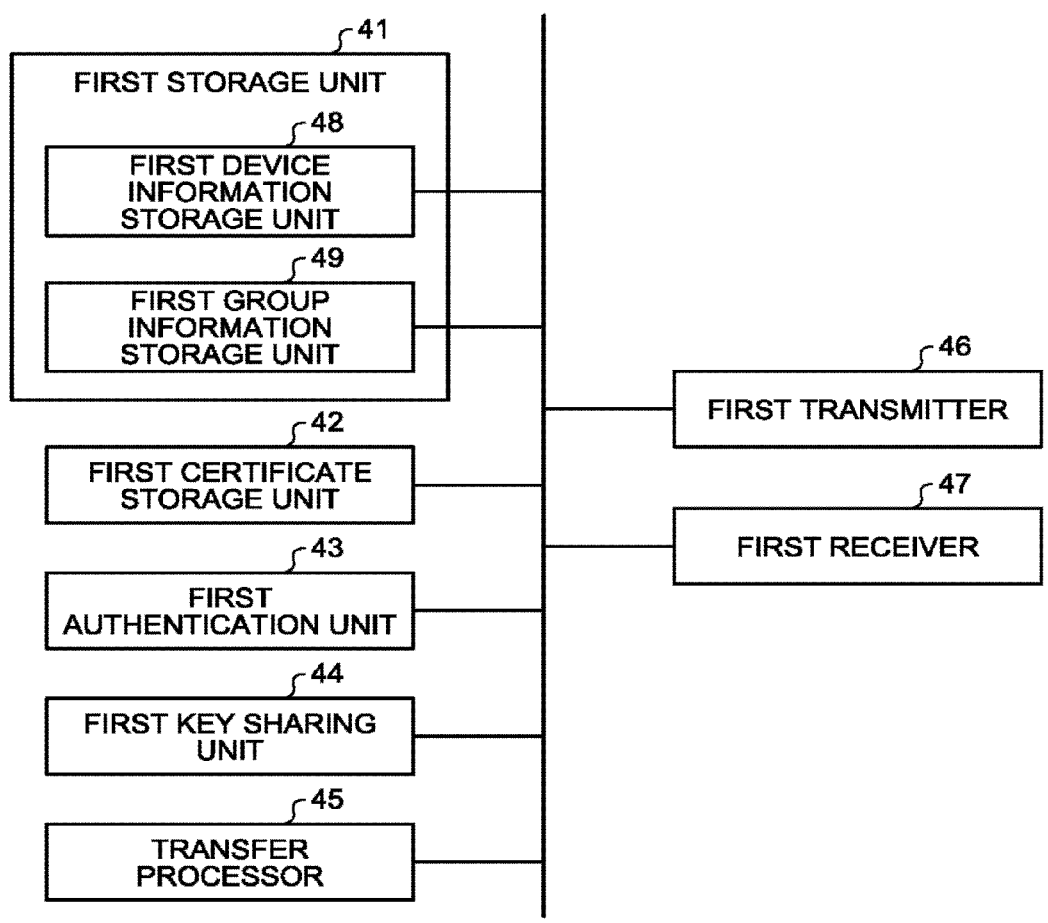
FIG. 3 is a diagram illustrating a configuration of a management apparatus.

FIG. 3 is a diagram illustrating a configuration of the management apparatus 20. The management apparatus 20 includes a first storage unit 41, a first certificate storage unit 42, first authentication unit 43, a first key sharing unit 44, a transfer processor 45, a first transmitter 46, and a first receiver 47.

The first storage unit 41 stores therein information held by the devices 30. In the present embodiment, the first storage unit 41 includes a first device information storage unit 48 and a first group information storage unit 49.

The first device information storage unit 48 stores therein device information including pieces of information individually held by the respective devices 30. Specifically, the first device information storage unit 48 stores therein device information including device keys held by the respective devices 30. The device information is, for example, information in which a device identifier for identifying the device 30 is associated with at least one device key held by the device 30 for each of the devices 30, as illustrated in FIG. 4.

The first group information storage unit 49 stores therein group information including information held in common by the devices 30 belonging to a group. Specifically, the first group information storage unit 49 stores therein group information including group keys held by the devices 30 belonging to the respective groups. For example, the group information is information in which a group identifier for identifying a group is associated with a group key of the group and device identifiers of devices 30 belonging to the group, for each of the groups, as illustrated in FIG. 5.

The first certificate storage unit 42 stores therein a certificate used for mutual authentication and corresponding secret information. The certificate may be information corresponding to a public key, or information corresponding to a pre-shared key, as long as it is information corresponding to the mutual authentication method to be used. The first certificate storage unit 42 acquires and stores therein a certificate issued for a regular device.

The first authentication unit 43 performs mutual authentication with the server 40 or the device 30 using the certificate and the secret information stored in the first certificate storage unit 42. When management information is transmitted to the server 40 to transfer authority, and when management information is received from the server 40 to transfer authority, the first authentication unit 43 checks whether the server 40 holds a certificate issued for a regular device and corresponding secret information, to determine whether the server 40 is qualified to store therein information necessary for authority transfer.

The first key sharing unit 44 executes processing to share the device key with the device 30. The first key sharing unit 44 also executes processing to share a shared key with the server 40.

The transfer processor 45 executes processing to transfer the management authority to manage the devices 30 to another management apparatus 20, and processing to receive transfer of management authority from another management apparatus 20. More detailed structure of the transfer processor 45 will be described later with reference to FIG. 8.

The first transmitter 46 transmits data to the server 40 and the devices 30 through the network. The first receiver 47 receives data from the server 40 and the devices 30 through the network.

Figure 6:
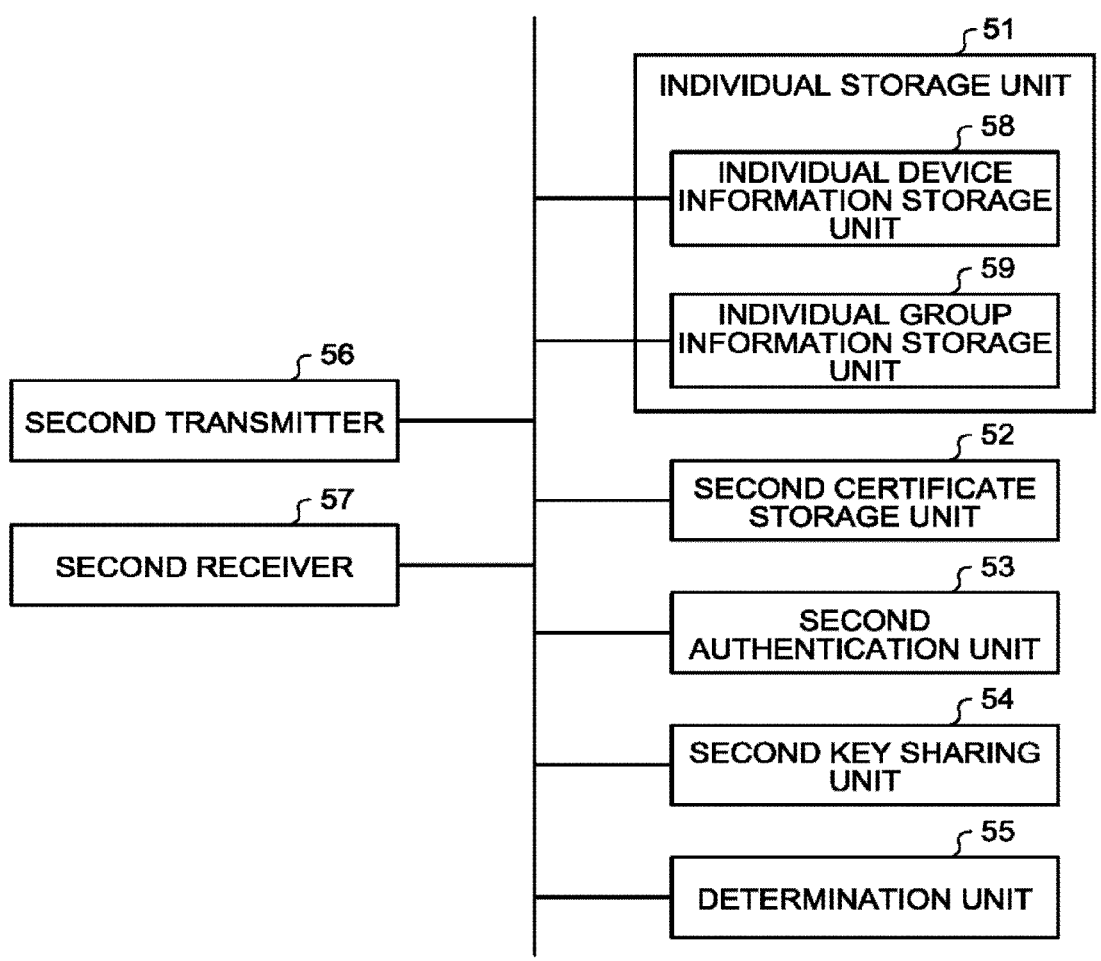
FIG. 6 is a diagram illustrating a configuration of a device.

FIG. 6 is a diagram illustrating configuration of each device 30. Each device 30 includes an individual storage unit 51, a second certificate storage unit 52, a second authentication unit 53, a second key sharing unit 54, a determination unit 55, a second transmitter 56, and a second receiver 57.

The individual storage unit 51 stores therein information held by the device 30. In the present embodiment, the individual storage unit 51 includes an individual device information storage unit 58 and an individual group information storage unit 59.

The individual device information storage unit 58 stores therein information held by the device 30. Specifically, the individual device information storage unit 58 stores therein a device key held by the device 30, and a device identifier for identifying the device 30.

The individual group information storage unit 59 stores therein information held in common by the devices 30 belonging to the group to which the device 30 belongs. Specifically, the individual group information storage unit 59 stores therein a group key of the group to which the device 30 belongs, a group identifier for identifying the group to which the device 30 belongs, and device identifiers of the respective devices 30 belonging to the group.

The second certificate storage unit 52 stores therein the certificate used for mutual authentication and corresponding secret information. The certificate may be information corresponding to a public key, or information corresponding to a pre-shared key, as long as the information is information corresponding to the mutual authentication method to be used.

The second authentication unit 53 executes mutual authentication with another device 30 or the management apparatus 20 using the certificate and the corresponding secret information stored in the second certificate storage unit 52. When authority transfer is performed, the second authentication unit 53 checks whether the management apparatus 20 holds a certificate issued for a regular device and corresponding secret information, to determine whether the management apparatus 20 is qualified for authority transfer. The second key sharing unit 54 executes processing to share the device key with the management apparatus 20.

The determination unit 55 executes determination process using determination information, when management authority is transferred from the first management apparatus 20-1 to the second management apparatus 20-2. More detailed structure of the determination unit 55 will be described later with reference to FIG. 14.

The second transmitter 56 transmits data to another device 30 and the management apparatus 20 through the network. The second receiver 57 receives data from another device 30 and the management apparatus 20 through the network.

Figure 7:
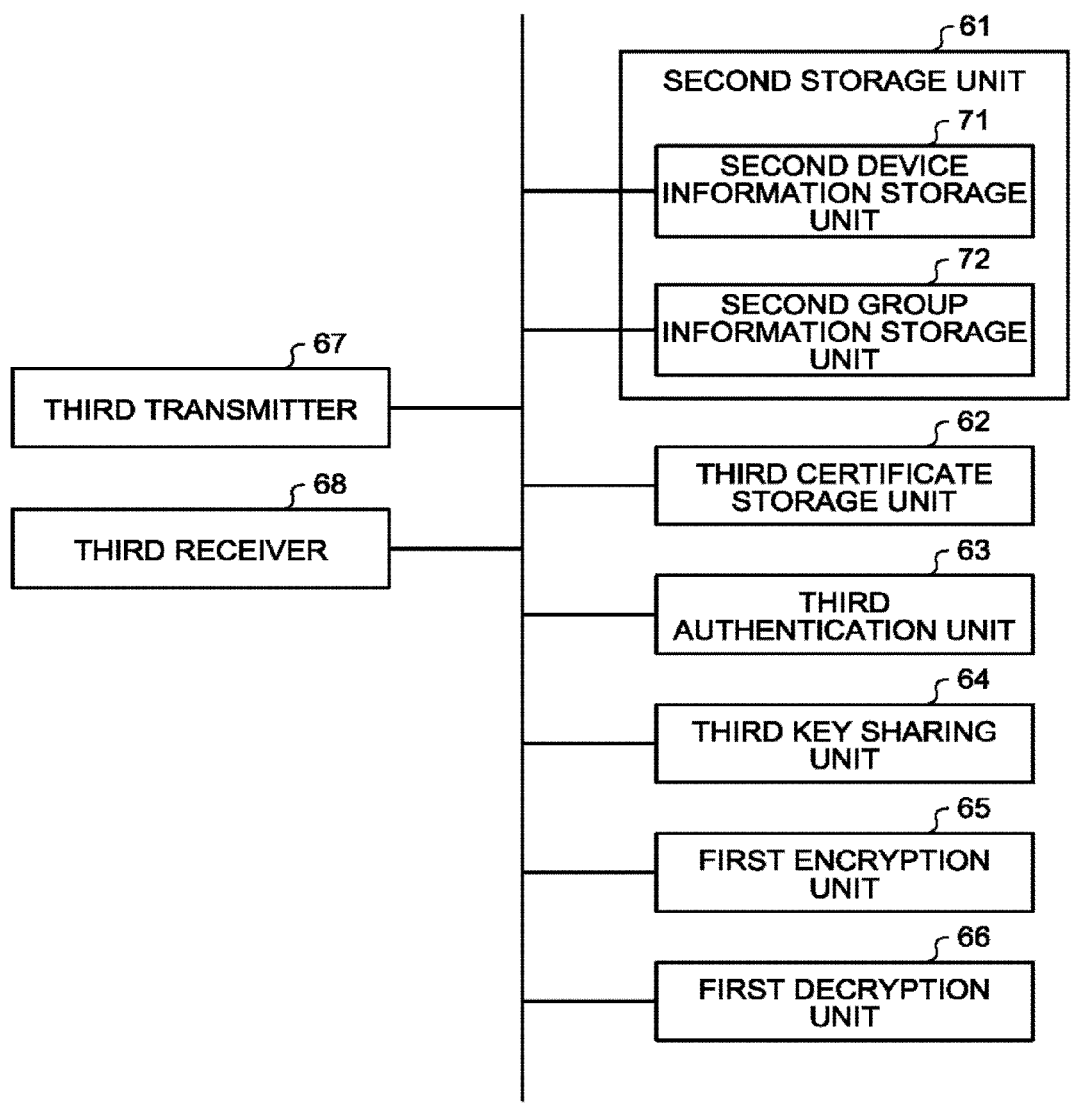
FIG. 7 is a diagram illustrating a configuration of a server.

FIG. 7 is a diagram illustrating configuration of the server 40. The server 40 includes a second storage unit 61, a third certificate storage unit 62, a third authentication unit 63, a third key sharing unit 64, a first encryption unit 65, a first decryption unit 66, a third transmitter 67, and a third receiver 68.

The second storage unit 61 stores therein information received from the management apparatus 20. In the present embodiment, the second storage unit 61 includes a second device information storage unit 71, and a second group information storage unit 72.

The second device information storage unit 71 stores therein device information including pieces of information held individually by respective devices 30 to be managed, of pieces of information received from the management apparatus 20. Specifically, the second device information storage unit 71 stores therein device information including device keys held by the respective devices 30.

The second group information storage unit 72 stores therein group information including information held in common by the devices 30 belonging to groups, of pieces of information received from the management apparatus 20. Specifically, the second group information storage unit 72 stores therein group information including group keys held by the devices 30 belonging to the respective groups.

The third certificate storage unit 62 stores therein a certificate used for mutual authentication and corresponding secret information. The certificate may be information corresponding to a public key, or information corresponding to a pre-shared key, as long as it is information corresponding to the mutual authentication method to be used.

The third authentication unit 63 executes mutual authentication with the management apparatus 20 using the certificate and the corresponding secret information stored in the third certificate storage unit 62. When management information is received, the third authentication unit 63 checks whether the management apparatus 20 holds a certificate issued for a regular device and corresponding secret information, to determine whether the management apparatus 20 is qualified to transmit management information. When management authority is transferred, the third authentication unit 63 checks whether the management apparatus 20 holds a certificate issued for a regular device and corresponding secret information, to determine whether the management apparatus 20 is qualified for authority transfer.

The third key sharing unit 64 shares an encryption key with the management apparatus 20. Specifically, when management information is received, the third key sharing unit 64 executes processing to share an encryption key to receive management information in a concealed state with the management apparatus 20. When management information is transmitted, the third key sharing unit 64 executes processing to share an encryption key to transmit management information in a concealed state with the management apparatus 20.

The first encryption unit 65 encrypts information using a transmission encryption key shared by the third key sharing unit 64. The first decryption unit 66 decrypts information using a reception encryption key shared with the third key sharing unit 64.

The third transmitter 67 transmits data to the management apparatus 20 through the network. The third receiver 68 receives data from the management apparatus 20 through the network.

Figure 8:
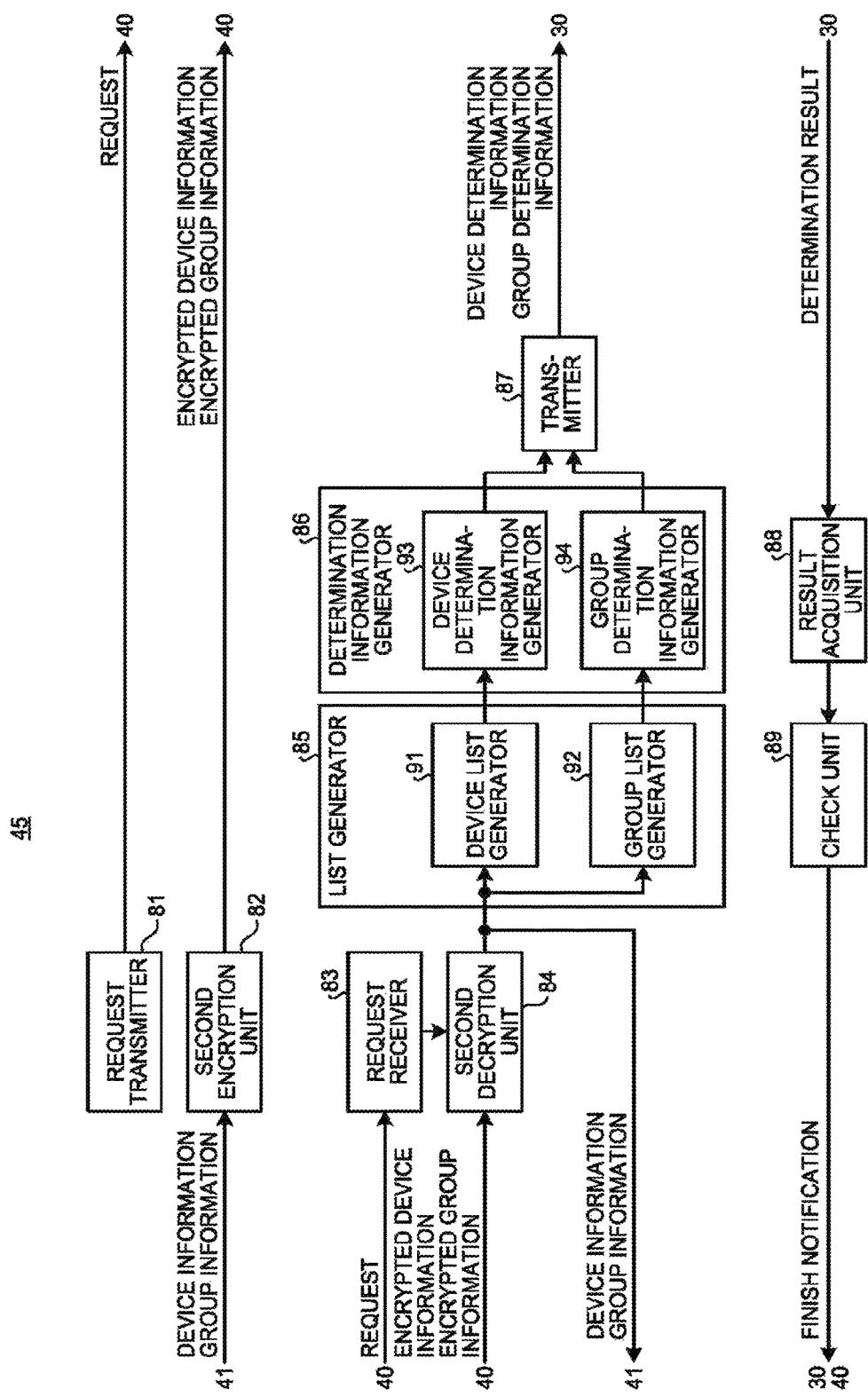
FIG. 8 is a diagram illustrating a configuration of a transfer processor.

FIG. 8 is a diagram illustrating configuration of the transfer processor 45. The transfer processor 45 includes a request transmitter 81, a second encryption unit 82, a request receiver 83, a second decryption unit 84, a list generator 85, a determination information generator 86, a transmitter 87, a result acquisition unit 88, and a check unit 89.

The request transmitter 81 transmits a request for management authority transfer to the server 40. The second encryption unit 82 encrypts information stored in the first storage unit 41 using a shared key generated by key sharing process with the server 40, and transmits the information to the server 40. In the present embodiment, the second encryption unit 82 encrypts device information and group information. Thereafter, the second encryption unit 82 transmits the encrypted device information and the encrypted group information to the server 40.

The second encryption unit 82 may encrypt part of the information stored in the first storage unit 41, and transmit the part of information to the server 40. In this manner, the second encryption unit 82 causes the server 40 or the second management apparatus 20-2 to bear part of the processing load of the first management apparatus 20-1, to reduce the processing load and enhance redundancy of the whole system.

The request receiver 83 receives a request for management authority transfer from the server 40. The second decryption unit 84 receives encrypted information from the server 40 that has requested transfer of management authority, and decrypts the information with a shared key. In the present embodiment, the second decryption unit 84 receives encrypted device information and encrypted group information, and decrypts the device information and the group information with the shared key. Thereafter, the second decryption unit 84 stores the decrypted information in the first storage unit 41. In the present embodiment, the second decryption unit 84 stores the decrypted device information in the first device information storage unit 48, and stores the decrypted group information in the first group information storage unit 49.

The list generator 85 generates a list of inspection values indicating pieces of information held by the devices 30 and stored in the first storage unit 41. In the present embodiment, the list generator 85 includes a device list generator 91, and a group list generator 92.

The device list generator 91 generates a device list serving as a list of inspection values indicating device information stored in the first device information storage unit 48. The device list generator 91 generates an inspection value X based on a pair of the device identifier and the device key, for each of pairs of the device 30 and the device key, and generates a device list by listing generated inspection values X. The inspection value X is information for identifying a device. For example, as illustrated in FIG. 4, when the first device information storage unit 48 stores therein device information indicating that device keys K1, K2, K4, and K8 are assigned to the device 30 with the device identifier A, the device list generator 91 generates inspection values "$X_1$=(A, K1)", "$X_2$=(A, K2)", "$X_3$=(A, K4)", and "$X_4$=(A, K8)", as illustrated in FIG. 9, and determines inspection values for each of the other devices 30 in the same manner. The inspection value X may be an array including the device identifier and the device key, or a value obtained by synthesizing the device identifier with the device key with a predetermined function. The device list generator 91 may generate an inspection value X based on a pair of the device identifier of the device 30 and a list of device keys held by the device 30. For example, as illustrated in FIG. 4, when the first device information storage unit 48 stores therein device information indicating that device keys K1, K2, K4, and K8 are assigned to the device 30 with the device identifier A, the device list generator 91 generates an inspection value "$X_1$=(A, K1, K2, K4, K8)" as illustrated in FIG. 10, and determines inspection values for the other devices 30 in the same manner.

The group list generator 92 generates a group list serving as a list of inspection values indicating pieces of group information stored in the first group information storage unit 49. The group list generator 92 generates an inspection value Y based on a set of the group identifier, the group key, and the device identifier for each pair of the group and the device 30, and generates a group list by listing generated inspection values Y. The inspection values Y serve as information for identifying a set of a plurality of devices. For example, when the first group information storage unit 49 stores therein the group information illustrated in FIG. 5, the group list generator 92 generates inspection values "$Y_1=(\alpha, GK\alpha, A)$", "$Y_2=(\alpha, GK\alpha, B)$", "$Y_3=(\beta, GK\beta, A)$", "$Y_4=(\beta, GK\beta, B)$", "$Y_5=(\beta, GK\beta, C)$", "$Y_6=(\beta, GK\beta, D)$", "$Y_7=(\gamma, GK\gamma, E)$", and "$Y_8=(\gamma, GK\gamma, F)$", as illustrated in FIG. 11. The inspection value Y may be an array including the group identifier, the group key, and the device identifier, or a value obtained by synthesizing the group identifier, the group key, and the device identifier with a predetermined function. The group list generator 92 may generate an inspection value Y based on a set of the device identifier of the device 30 and a list of the group identifiers and the group keys of the groups to which the device 30 belongs. For example, when the first group information storage unit 49 stores therein the group information illustrated in FIG. 5, the device list generator 91 generates inspection values "$Y_1=A, (\alpha, GK\alpha), (\beta, GK\alpha)$", "$Y_2=B, (\alpha, GK\alpha), (\beta, GK\beta)$", "$Y_3=C, (\beta, GK\beta)$", "$Y_4=D, (\beta, GK\beta)$", "$Y_5=E, (\gamma, GK\gamma)$", and "$Y_6=F, (\gamma, GK\gamma)$", as illustrated in FIG. 12.

The determination information generator 86 generates determination information to determine whether the provided information is included in the list, in a state where the list is concealed. For example, the determination information executes determination without the possibility of false negative in which information included in the list is erroneously determined not to be included in the list, but having the possibility of false positive in which information that is not included in the list is erroneously determined to be included in the list. In the present embodiment, the determination information is a bloom filter.

Figure 13:
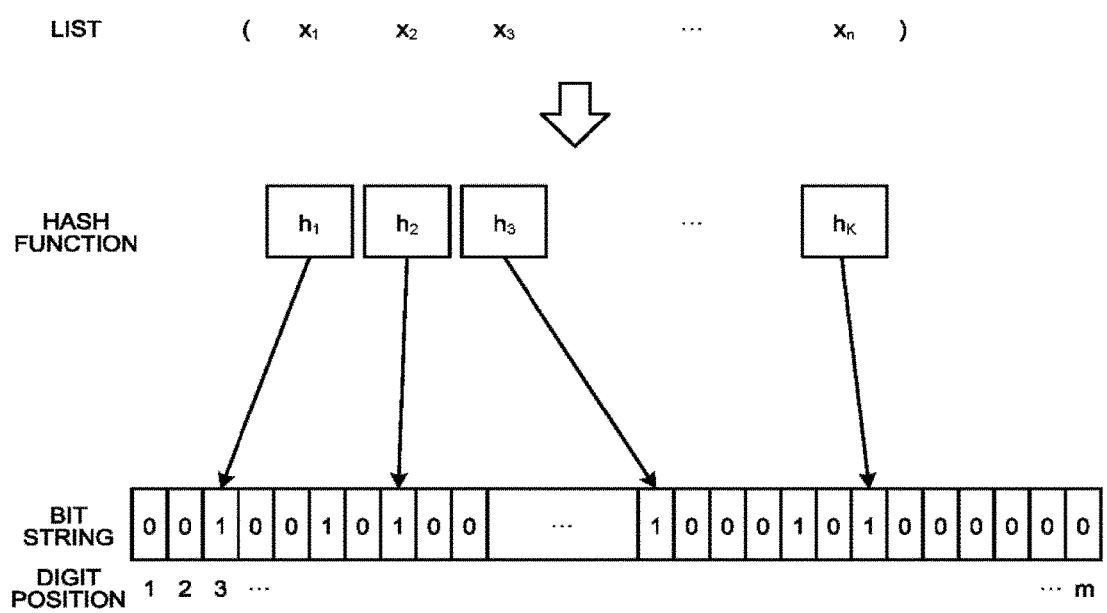
FIG. 13 is a diagram illustrating a structure of a bloom filter.

As illustrated in FIG. 13, the bloom filter is information including k (k is an integer of 2 or more) hash functions, and a bit string of m digits (m is an integer of 2 or more). Each hash function is a unidirectional function indicating one of the m digits when the value is input. The bit string of m digits is generated as follows. For example, first, values of all the digits of the bit string of m digits are set to 0. Then, all the inspection values $(x_1, x_2, \ldots x_n)$ included in the list are input to k hash functions. In the bit string of m digits, values of digits obtained by inputting all the inspection values $(x_1, x_2, \ldots x_n)$ to the k hash functions are replaced by 1.

In such a bloom filter, when any input value is provided, the input value is input to the k hash functions, to obtain k digit positions. Then, the bloom filter determines whether all the values of k digit positions in the bit string of m digits are 1. When all the values of k digits are 1, the bloom filter determines that the input value is included in the list. When a value of any one of the k digits is 0, the bloom filter determines that the input value is not included in the list.

As described above, the bloom filter is capable of determining whether any input value agrees with any of inspection values included in the list. In addition, because the original inspection value cannot be restored from the bit string of m digits, the bloom filter is capable of concealing the list.

The bloom filter is also capable of adjusting the probability of false positive, by changing the number k of hash functions and the bit length m of the bit string. The determination information generator 86 set the probability of false positive within a predetermined range, by adjusting these parameters. For example, the determination information generator 86 generates a bloom filter to set the probability of false positive larger than a preset lower limit threshold. In this manner, the determination information generator 86 is enabled to prevent an illegal device from supplying an illegal bloom filter with low probability of false positive to the device 30 and illegally acquiring information held by the device 30.

The bloom filter may have a structure of acquiring k digit positions using a predetermined single hash function and a plurality (k) of different initial values. The predetermined hash function is a unidirectional function indicating one digit of the m digits when provided with a pair of any initial value and any inspection value included in the list. Accordingly, in this case, the determination information generator 86 generates a plurality of initial values, and inputs pairs of the initial values and the respective inspection values included in the list to the predetermined single hash function, to generate a bit string included in the bloom filter. The determination information generator 86 may input time information or a sequence number or the like to a random number generator, to generate k initial values.

The determination information generator 86 may generate another piece of determination information, instead of a bloom filter. For example, the determination information generator 86 may generate determination information formed of computer program codes, or generate determination information with an automaton.

In the present embodiment, the determination information generator 86 includes a device determination information generator 93 and a group determination information generator 94. The device determination information generator 93 generates device determination information for determining whether the provided value is included in the device list, in a state where the device list is concealed. As an example, the device determination information generator 93 generates device determination information serving as a bloom filter including $k_1$ ($k_1$ is an integer of 2 or more) hash functions and a bit string of $m_1$ digits ($m_1$ is an integer of 2 or more).

The group determination information generator 94 generates group determination information for determining whether the provided value is included in the group list, in a state where the group list is concealed. As an example, the group determination information generator 94 generates group determination information serving as a bloom filter including $k_2$ ($k_2$ is an integer of 2 or more) hash functions and a bit string of $m_2$ digits ($m_2$ is an integer of 2 or more).

The transmitter 87 transmits determination information to the respective devices 30. In the present embodiment, the transmitter 87 transmits the device determination information and the group determination information to the respective devices 30.

The transmitter 87 is not required to transmit all pieces of information forming the determination information, as long as the transmitter 87 transmits information necessary for reproducing the determination information in the device 30. For example, when the bloom filter has a structure of acquiring digit positions from a predetermined hash function and a plurality (k) of different initial values, because the device 30 can store the hash function in advance, the transmitter 87 is not required to transmit the hash function. In addition, when the initial values are generated by a random number generator and both the device 30 and the management apparatus 20 include the same random number generator, it suffices for the transmitter 87 to transmit information serving as the source of the initial values, for example, a value with low possibility that the same value is selected, such as time information and a sequence number, to the device 30. In this manner, the transmitter 87 is enabled to generate an initial value different from an initial value generated in the past, and prevent improper use of a bloom filter generated in the past.

In addition, the transmitter 87 may multicast determination information to a plurality of devices 30 connected to the network. The transmitter 87 may add a signature to determination information and transmit the determination information with signature to the device 30. This structure enables the device 30 to check whether the management apparatus 20 serving as the transmission source of the determination information is a right apparatus.

The result acquisition unit 88 acquires, from each of the devices 30, a determination result obtained by determining, based on the determination information, whether the inspection value indicating the information held by the device 30 is included in the list. In the present embodiment, the result acquisition unit 88 acquires determination results obtained by determination based on the device determination information and the group determination information from the devices 30.

The check unit 89 checks rightness of information stored in the first storage unit 41, based on the determination results acquired from the respective devices 30. In the present embodiment, the check unit 89 checks rightness of the device information stored in the first device information storage unit 48 and the group information stored in the first group information storage unit 49. When the information is right, the check unit 89 causes the management apparatus to start management of the devices 30 using the information stored in the first storage unit 41. When the information is not right, the check unit 89 disables the information stored in the first storage unit 41, to stop transfer of the management authority.

When the check unit 89 acquires the determination results each indicating that the inspection value indicating the information held by the device is included in the list from the predetermined number or more of devices 30, the check unit 89 may determine that the information stored in the first storage unit 41 is right. For example, when the check unit 89 acquires the determination results each indicating that the inspection value indicating the information held by the device is included in the list from devices 30 of at least ⅔ as many as the devices 30 connected through the network, the check unit 89 may determine that the information stored in the first storage unit 41 is right. Alternatively, when the check unit 89 acquires determination results each indicating that an inspection value indicating the information held by the device is included in the list from all the devices 30 connected through the network, the check unit 89 may determine that the information stored in the first storage unit 41 is right.

Figure 14:
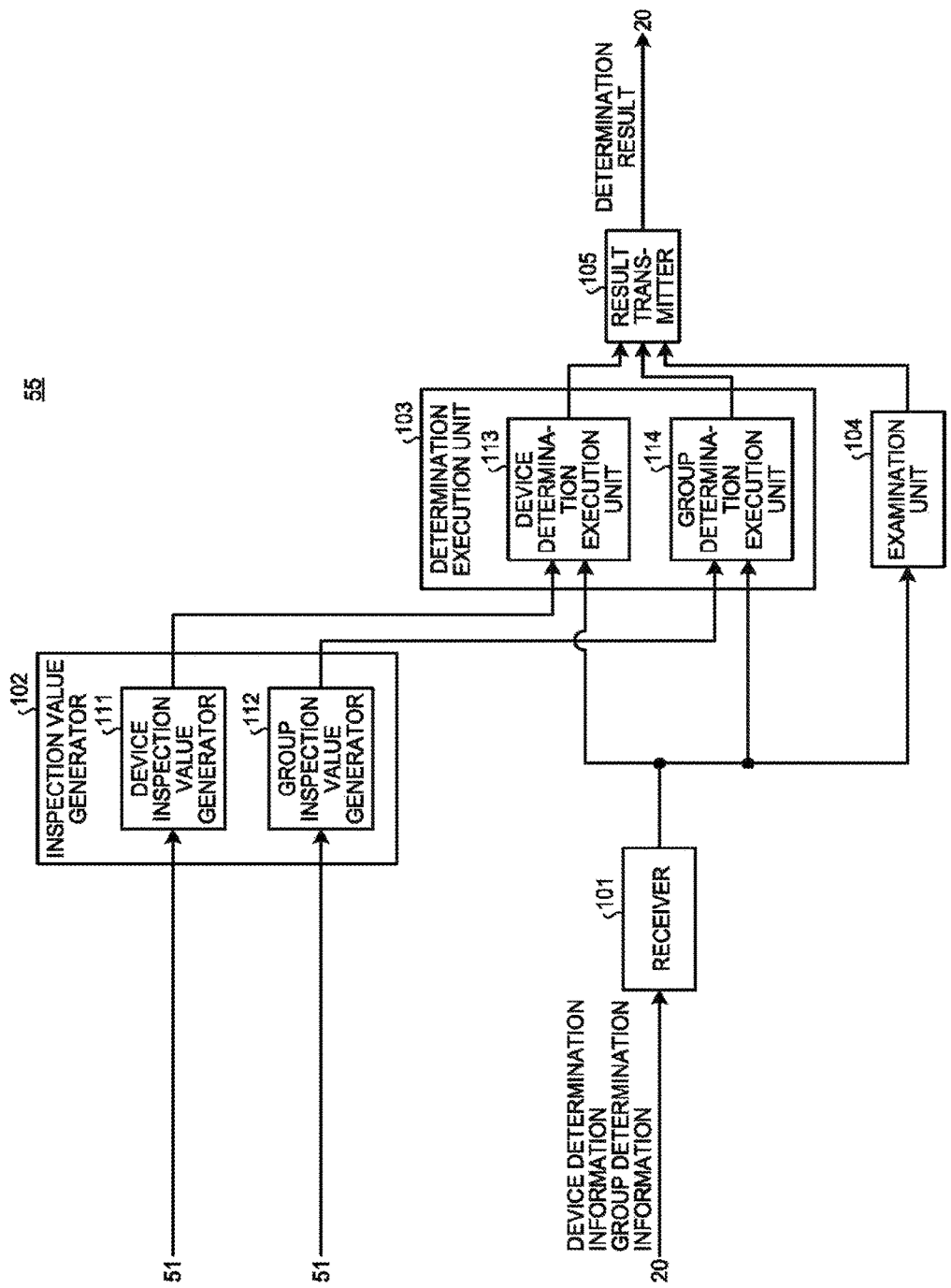
FIG. 14 is a diagram illustrating a configuration of a determination unit.

FIG. 14 is a diagram illustrating configuration of the determination unit 55. The determination unit 55 includes a receiver 101, an inspection value generator 102, a determination execution unit 103, an examination unit 104, and a result transmitter 105.

The receiver 101 receives determination information from the management apparatus 20. In the present embodiment, the receiver 101 receives device determination information being a bloom filter and group determination information being a bloom filter.

The inspection value generator 102 acquires information individually held by the device 30 from the individual storage unit 51, to generate an inspection value indicating information individually held by the device 30. In the present embodiment, the inspection value generator 102 includes a device inspection value generator 111, and a group inspection value generator 112.

The device inspection value generator 111 acquires device keys held by the device 30, and the device identifier for identifying the device 30, which are stored in the individual device information storage unit 58. The device inspection value generator 111 generates inspection values X based on pairs of the device identifier and device keys. The inspection value X is a value generated by the same method as that for the inspection values included in the device list in the management apparatus 20.

The group inspection value generator 112 acquires group keys of the groups to which the device 30 belongs, group identifiers for identifying the groups to which the device 30 belongs, and the device identifier for identifying the device 30, which are stored in the individual group information storage unit 59. The group inspection value generator 112 generates inspection values Y based on sets of the group identifiers, the group keys, and the device identifier. The inspection values Y are values generated by the same method as that for the inspection values included in the group list in the management apparatus 20.

The determination execution unit 103 supplies the inspection values generated by the inspection value generator 102 to the determination information received by the receiver 101, to determine whether the inspection values are included in the list using the determination information. In the present embodiment, the determination execution unit 103 includes a device determination execution unit 113, and a group determination execution unit 114.

The device determination execution unit 113 determines whether the inspection value is included in the device list for each of the inspection values generated by the device inspection value generator 111, using the device determination information received by the receiver 101. In the present embodiment, the device determination execution unit 113 supplies the inspection value to $k_1$ hash functions included in the bloom filter, to acquire $k_1$ digit positions. When all the values of the acquired $k_1$ digit positions are 1 in the bit string with the number $m_1$ of digits included in the bloom filter, the device determination execution unit 113 determines that the inspection value is included in the device list. When the values of the acquired $k_1$ digit positions include 0, the device determination execution unit 113 determines that the inspection value is not included in the device list.

The group determination execution unit 114 determines whether the inspection value is included in the group list for each of the inspection values generated by the group inspection value generator 112, using the group determination information received by the receiver 101. In the present embodiment, the group determination execution unit 114 supplies the inspection value to $k_2$ hash functions included in the bloom filter, to acquire $k_2$ digit positions. When all the values of the acquired $k_2$ digit positions are 1 in the bit string with the number $m_2$ of digits included in the bloom filter, the group determination execution unit 114 determines that the inspection value is included in the group list. When the values of the acquired $k_2$ digit positions include 0, the group determination execution unit 114 determines that the inspection value is not included in the group list.

The receiver 101 may receive a plurality of initial values, instead of the hash functions. In this case, the determination execution unit 103 inputs pairs of the inspection values and the initial values to the predetermined single hash function, to acquire a plurality of digit positions. The determination execution unit 103 may include a random number generator that is the same as the random number generator of the management apparatus 20. In this case, the receiver 101 receives information (such as time information and a sequence number) serving as a source of initial values, instead of a plurality of initial values. Thereafter, the determination execution unit 103 inputs the source to the random number generator, to generate a plurality of initial values.

The examination unit 104 examines whether the determination information received by the receiver 101 is right. In the present embodiment, the examination unit 104 examines whether the device determination information and the group determination information are right. When the determination information is a bloom filter, the examination unit 104 examines whether the probability of false positive falls within a predetermined range. For example, the examination unit 104 calculates a first threshold from the number of digits of the bit string of the bloom filter, to examine whether the Hamming weight of the bloom filter is equal to or less than the first threshold. In this manner, the examination unit 104 is enabled to examine whether the probability of false positive is equal to or less than a preset probability. The examination unit 104 is also enabled to detect determination information with the probability of false positive higher than the set value, to detect determination information transmitted from an illegal device pretending to be the management apparatus 20 or detect the management apparatus 20 generating illegal determination information due to malfunction or attack. The examination unit 104 also calculates a second threshold from the number of digits of the bit string of the bloom filter, to examine whether the Hamming weight of the bloom filter is equal to or higher than the second threshold. In this manner, the examination unit 104 is enabled to examine whether the probability of false positive is equal to or higher than a preset probability. The examination unit 104 is also enabled to detect determination information with the probability of false positive lower than the set value, to detect determination information transmitted from an illegal device pretending to be the management apparatus 20 or detect the management apparatus 20 generating illegal determination information due to malfunction or attack.

When the determination information is provided with a digital signature, the examination unit 104 examines whether the digital signature is right. In this manner, the examination unit 104 is enabled to detect determination information transmitted from an illegal device pretending to be the management apparatus 20.

The result transmitter 105 transmits determination results obtained by examination performed by the determination execution unit 103 using the determination information to the management apparatus 20. In the present embodiment, the result transmitter 105 transmits determination results based on the device determination information and determination results based on the group determination information. For example, a determination result is found eligible when the determination result based on the device determination information is found eligible and the determination result based on the group determination information is found eligible. As another example, a determination result may be information coupling the determination result based on the device determination information with the determination result based on the group determination information. When the examination unit 104 determines that the determination information is right, the result transmitter 105 transmits a determination result. When the examination unit 104 determines that the determination information is not right, the result transmitter 105 transmits no determination result. This enables the result transmitter 105 to prevent transmission of a determination result to an illegal device.

When the communication system 10 is a system in which transmission of a determination result to an illegal device causes no problem, the result transmitter 105 may transmit a determination result even when it is determined that the determination information is not right.

Figure 15:
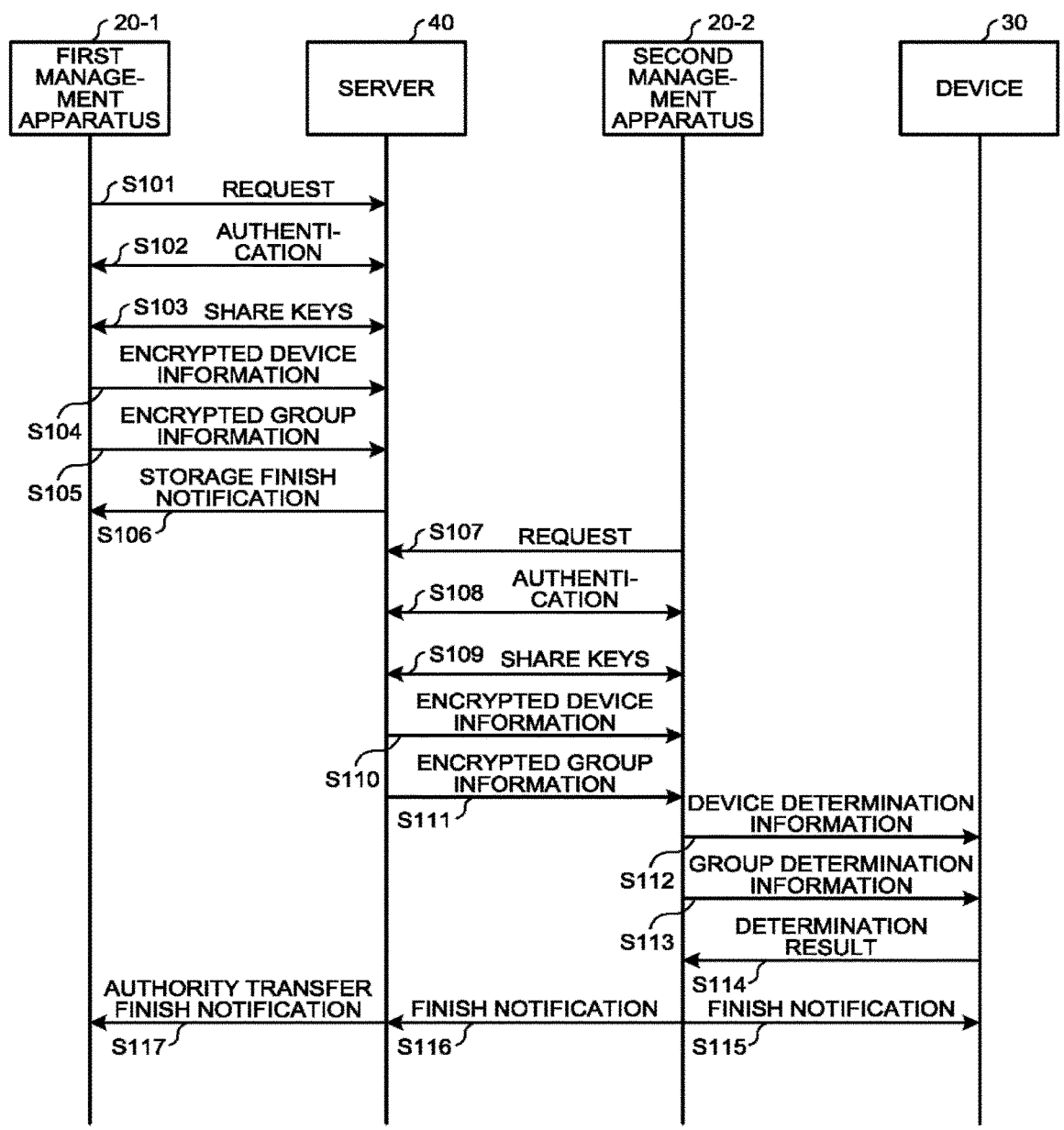
FIG. 15 is a sequence diagram illustrating a process sequence of the communication system.

FIG. 15 is a sequence diagram illustrating a process sequence of the communication system 10. The communication system 10 executes processing to transfer management authority in accordance with the sequence illustrated in FIG. 15.

First, the first management apparatus 20-1 requests the server 40 to store management authority for a plurality of devices 30 (step S101). Thereafter, the first management apparatus 20-1 and the server 40 execute mutual authentication (step S102). When mutual authentication succeeds, the first management apparatus 20-1 and the server 40 mutually share keys (step S103).

When key sharing succeeds, the first management apparatus 20-1 encrypts device information with a shared key, and transmits the device information to the server 40 (step S104). Thereafter, the server 40 receives the encrypted device information, and decrypts the device information. Thereafter, the first management apparatus 20-1 encrypts group information with a shared key, and transmits the group information to the server 40 (step S105). The server 40 receives the encrypted group information, and decrypts the group information.

When decryption of the device information and the group information succeeds, the server 40 transmits a storage finish notification to the first management apparatus 20-1 (step S106).

Thereafter, the second management apparatus 20-2 requests the server 40 to transfer management authority for the devices 30 managed by the first management apparatus 20-1 (step S107). The server 40 and the second management apparatus 20-2 execute mutual authentication (step S108). When mutual authentication succeeds, the second management apparatus 20-2 and the server 40 mutually share keys (step S109).

When key sharing succeeds, the server 40 encrypts device information with a shared key, and transmits the device information to the second management apparatus 20-2 (step S110). Thereafter, the second management apparatus 20-2 receives the encrypted device information, and decrypts the device information. Thereafter, the server 40 encrypts group information with a shared key, and transmits the group information to the second management apparatus 20-2 (step S111). The second management apparatus 20-2 receives the encrypted group information, and decrypts the group information.

Thereafter, the second management apparatus 20-2 generates a device list from the decrypted device information, and generates device determination information based on the device list. Thereafter, the second management apparatus 20-2 transmits the device determination information to the devices 30 (step S112). The second management apparatus 20-2 generates a group list from the decrypted group information, and generates group determination information based on the group list. Thereafter, the second management apparatus 20-2 transmits the group determination information to the devices 30 (step S113).

Each device 30 receives the device determination information, and determines whether the inspection value based on a pair of the device key held by the device 30 and the device identifier is included in the device list. The device 30 also receives the group determination information, and determines whether the inspection value based on a set of the group identifier for identifying the group to which the device 30 belongs, the group key, and the device identifier is included in the group list. The device 30 transmits a determination result to the second management apparatus 20-2 (step S114).

The second management apparatus 20-2 determines whether the device information and the group information acquired from the first management apparatus 20-1 are right, based on determination results received from the devices 30. The second management apparatus 20-2 determines that the device information and the group information are right, when the second management apparatus 20-2 acquires determination results each indicating that the inspection value indicating the information held by the device is included in the list, from devices 30 of at least ⅔ as many as the devices 30, for both the device information and the group information.

When it is determined that both the device information and the group information are right, the second management apparatus 20-2 operates as an apparatus having management authority thereafter. In addition, the second management apparatus 20-2 transmits a finish notification to each of the devices 30 (step S115). In this manner, the devices 30 operate thereafter with recognition that the second management apparatus 20-2 is an apparatus having right management authority. The second management apparatus 20-2 also transmits a finish notification to the server 40 (step S116). For example, the finish notification is information to notify the device that examination of information received for authority transfer is finished normally. As another example, the finish notification may be information coupling the examination results received from the devices 30.

Thereafter, the server 40 transmits an authority transfer finish notification to the first management apparatus 20-1 (step S117). In this manner, the first management apparatus 20-1 stops operating as an apparatus having management authority thereafter.

Figure 16:
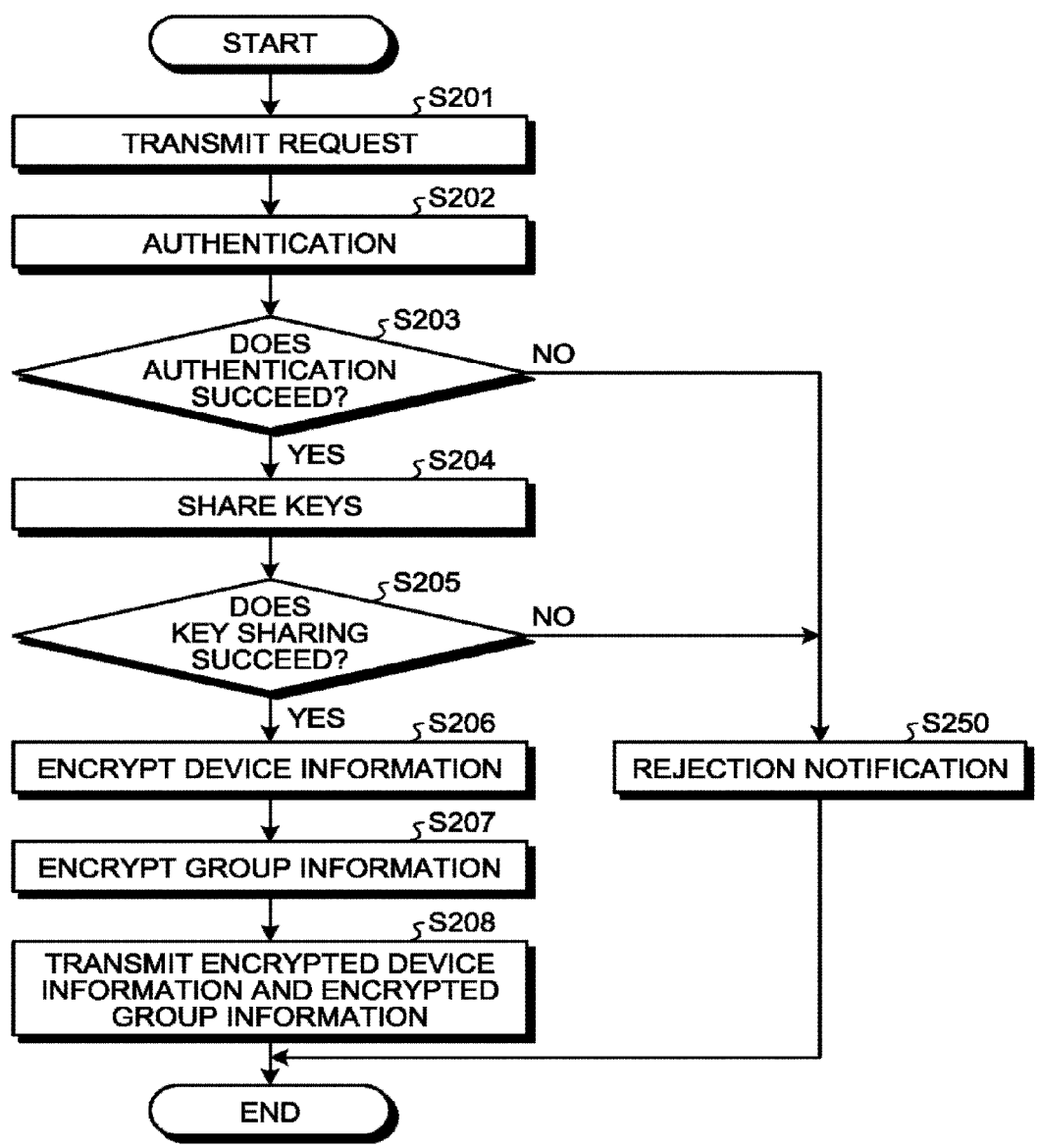
FIG. 16 is a flowchart illustrating a process sequence of a first management apparatus.

FIG. 16 is a flowchart illustrating a process sequence of the first management apparatus 20-1. The first management apparatus 20-1 executes processing to store management information for transferring management authority, in accordance with the flowchart illustrated in FIG. 16.

First, the request transmitter 81 transmits a request to perform storing process of management information to transfer management authority to the server 40 (step S201). Thereafter, the first authentication unit 43 performs mutual authentication with the server 40 (step S202). When authentication does not succeed (No at step S203), the first authentication unit 43 transmits a rejection notification to the server 40 (step S250), and ends the processing.

When authentication succeeds (Yes at step S203), the first key sharing unit 44 shares keys with the server 40 (step S204). When key sharing does not succeed (No at step S205), the first authentication unit 43 transmits a rejection notification to the server 40 (step S250), and ends the processing.

When key sharing succeeds (Yes at step S205), the second encryption unit 82 encrypts device information with a shared key (step S206). Thereafter, the second encryption unit 82 encrypts group information with a shared key (step S207). The second encryption unit 82 transmits the encrypted device information and the encrypted group information to the server 40 (step S208), and ends the present flow.

Figure 17:
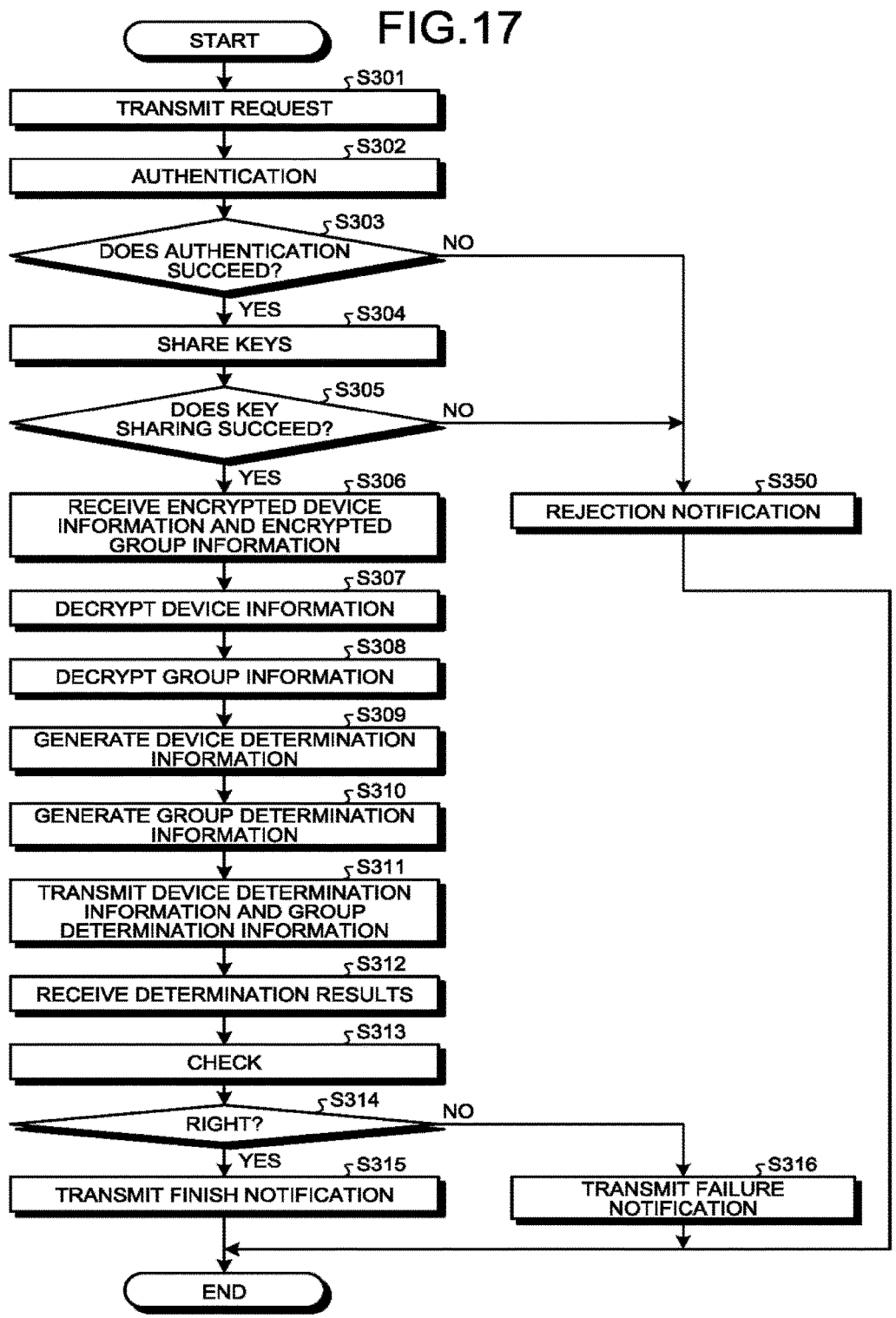
FIG. 17 is a flowchart illustrating a process sequence of a second management apparatus.

FIG. 17 is a flowchart illustrating a process sequence of the second management apparatus 20-2. The second management apparatus 20-2 executes management authority transfer process, in accordance with the flowchart illustrated in FIG. 17.

First, the request transmitter 81 transmits a request to transfer management authority to the server 40 (step S301). Thereafter, the first authentication unit 43 performs mutual authentication with the server 40 (step S302). When authentication does not succeed (No at step S303), the first authentication unit 43 transmits a rejection notification to the server 40 (step S350), and ends the processing.

When authentication succeeds (Yes at step S303), the first key sharing unit 44 shares keys with the server 40 (step S304). When key sharing does not succeed (No at step S305), the first authentication unit 43 transmits a rejection notification to the server 40 (step S350), and ends the processing.

When key sharing succeeds (Yes at step S305), the second decryption unit 84 receives the encrypted device information and the encrypted group information from the server 40 (step S306). Thereafter, the second decryption unit 84 decrypts the device information (step S307). The second decryption unit 84 also decrypts the group information (step S308).

Thereafter, the device list generator 91 generates a device list based on the decrypted device information. The device determination information generator 93 generates device determination information from the device list (step S309). The group list generator 92 generates a group list based on the decrypted group information. The group determination information generator 94 generates group determination information from the group list (step S310). The transmitter 87 transmits the device determination information and the group determination information to the respective devices 30 (step S311).

Thereafter, the result acquisition unit 88 receives determination results from the respective devices 30 (step S312). The check unit 89 checks whether the device information and the group information received from the server 40 are right, based on the determination results received from the respective devices 30 (step S313). When the device information and the group information are right (Yes at step S314), the check unit 89 transmits a finish notification to the server 40 and the respective devices 30 (step S315), and ends the present flow. When the device information and the group information are not right (No at step S314), the check unit 89 transmits a failure notification to the server 40 and the respective devices 30 (step S316), and ends the present flow.

Figure 18:
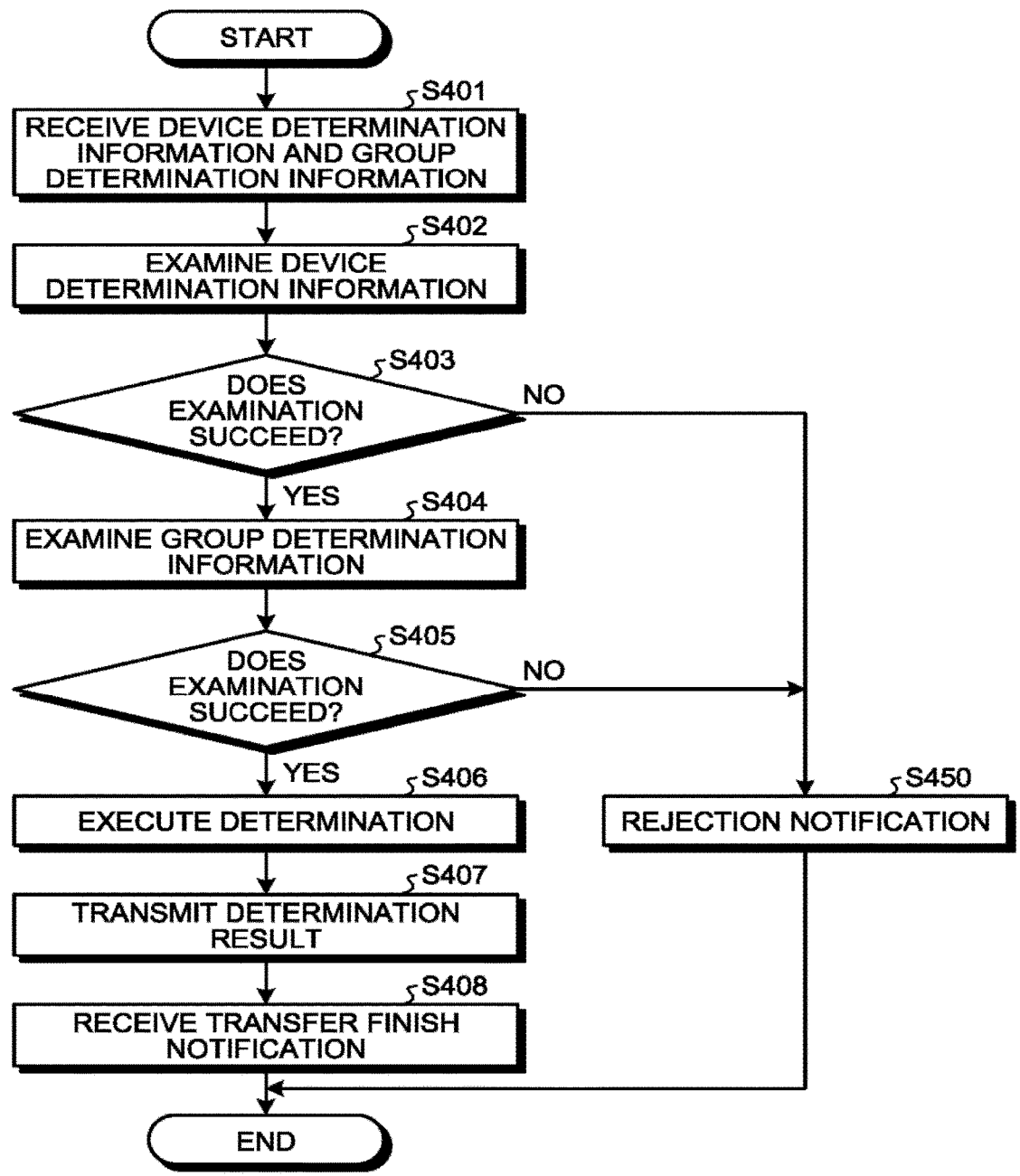
FIG. 18 is a flowchart illustrating a process sequence of the device.

FIG. 18 is a flowchart illustrating a process sequence of the device 30. Each device 30 executes determination process, in accordance with the flowchart illustrated in FIG. 18.

First, the receiver 101 receives device determination information and group determination information (step S401). Thereafter, the examination unit 104 determines whether the device determination information is right (step S402). For example, when the device determination information is a bloom filter, the examination unit 104 determines whether the probability of false positive falls within a predetermined range. When the examination does not succeed (No at step S403), that is, when the device determination information is not right, the result transmitter 105 transmits a rejection notification to the second management apparatus 20-2 (step S450), and ends the processing.

When the examination of the device determination information succeeds (Yes at step S403), that is, when the device determination information is right, the examination unit 104 determines whether the group determination information is right (step S404). For example, when the group determination information is a bloom filter, the examination unit 104 determines whether the probability of false positive falls within a predetermined range. When the examination does not succeed (No at step S405), that is, when the group determination information is not right, the result transmitter 105 transmits a rejection notification to the second management apparatus 20-2 (step S450), and ends the processing.

When the examination of the group determination information succeeds (Yes at step S405), that is, when the group determination information is right, the device determination execution unit 113 and the group determination execution unit 114 execute determination using the determination information (step S406). Specifically, the device determination execution unit 113 determines whether the inspection value based on the pair of the device key and the device identifier held by the device 30 is included in the device list, based on the device determination information. The group determination execution unit 114 determines whether the inspection value based on the set of the group identifier of the group to which the device 30 belongs, the group key, and the device identifier is included in the group list, based on the group determination information.

Thereafter, the result transmitter 105 transmits the determination result to the second management apparatus 20-2 (step S407). The receiver 101 receives a finish notification from the second management apparatus 20-2 (step S408), and ends the present flow.

Figure 19:
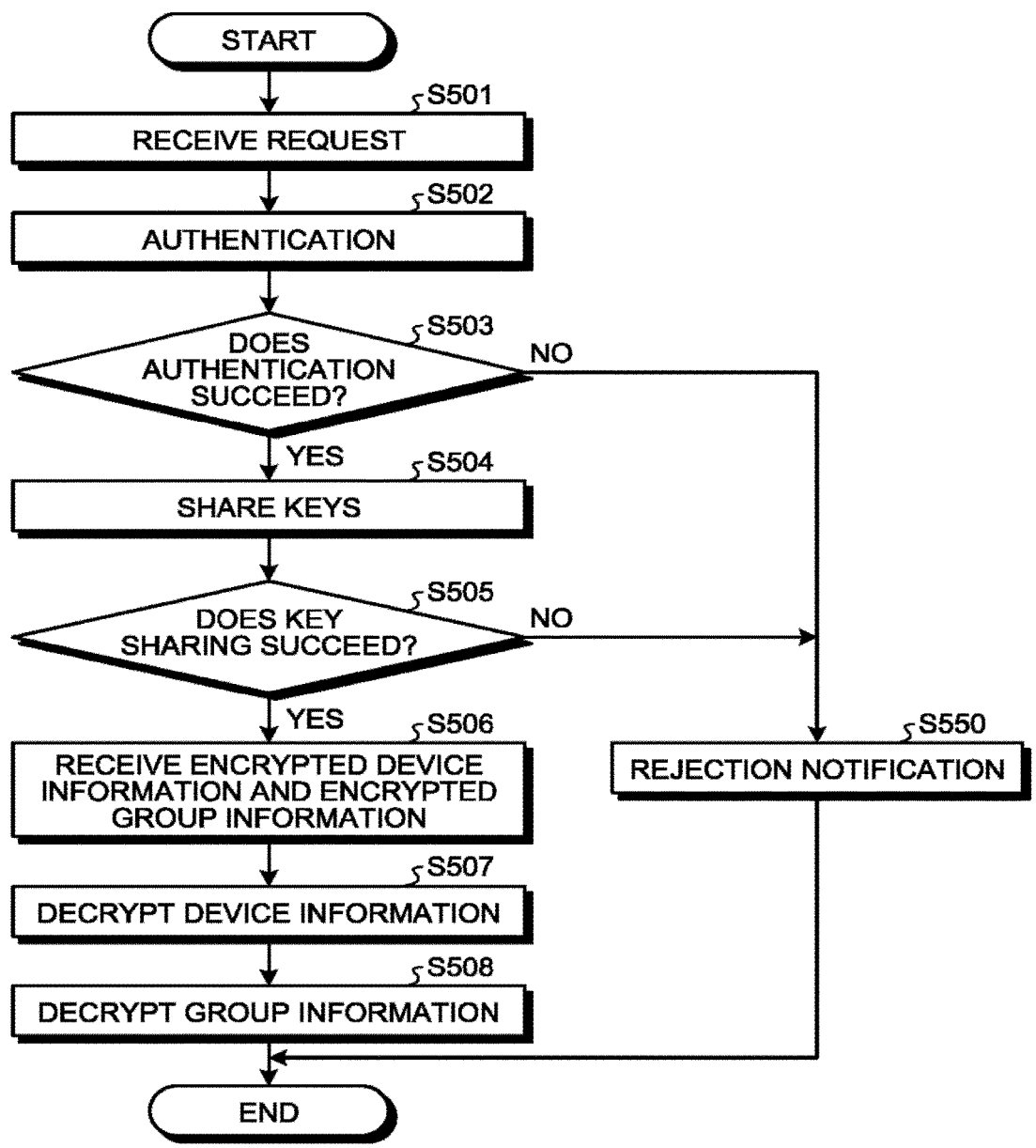
FIG. 19 is a flowchart illustrating a storage process sequence of the server.

FIG. 19 is a flowchart illustrating a management information storage process sequence of the server 40. The server 40 executes management information storing process for transferring management authority, in accordance with the flowchart illustrated in FIG. 19.

First, the third receiver 68 receives a request to store management information for transferring management authority from the first management apparatus 20-1 (step S501). Thereafter, the third authentication unit 63 executes mutual authentication with the first management apparatus 20-1 (step S502). When the authentication does not succeed (No at step S503), the third authentication unit 63 transmits a rejection notification to the first management apparatus 20-1 (step S550), and ends the processing.

When the authentication succeeds (Yes at step S503), the third key sharing unit 64 shares keys with the first management apparatus 20-1 (step S504). When key sharing does not succeed (No at step S505), the third authentication unit 63 transmits a rejection notification to the first management apparatus 20-1 (step S550), and ends the processing.

When key sharing succeeds (Yes at step S505), the first decryption unit 66 receives the encrypted device information and the encrypted group information from the first management apparatus 20-1 (step S506). Thereafter, the first decryption unit 66 decrypts the device information (step S507). The first decryption unit 66 also decrypts the group information (step S508), and ends the present flow.

Figure 20:
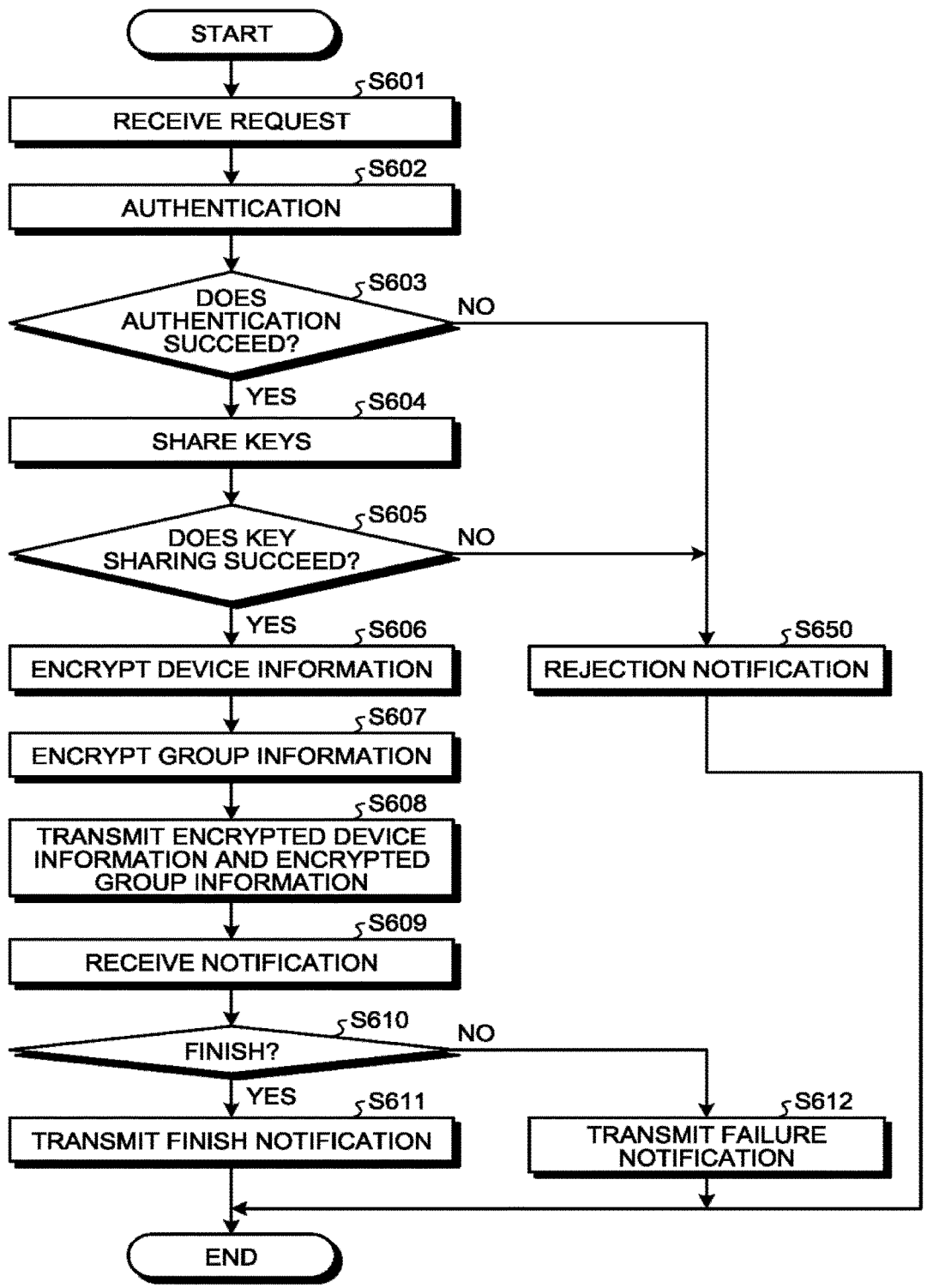
FIG. 20 is a flowchart illustrating a transfer process sequence of the server.

FIG. 20 is a flowchart illustrating an authority transfer process sequence of the server 40. The server 40 executes processing to transfer the management authority of the first management apparatus 20-1 to the second management apparatus 20-2 in accordance with the flowchart illustrated in FIG. 20.

First, the third receiver 68 receives a request to transfer management authority from the second management apparatus 20-2 (step S601). Thereafter, the third authentication unit 63 performs mutual authentication with the second management apparatus 20-2 (step S602). When authentication does not succeed (No at step S603), the third authentication unit 63 transmits a rejection notification to the second management apparatus 20-2 (step S650), and ends the processing.

When authentication succeeds (Yes at step S603), the third key sharing unit 64 share keys with the second management apparatus 20-2 (step S604). When key sharing does not succeed (No at step S605), the third authentication unit 63 transmits a rejection notification to the second management apparatus 20-2 (step S650), and ends the processing.

When key sharing succeeds (Yes at step S605), the first encryption unit 65 encrypts device information with a shared key (step S606). Thereafter, the first encryption unit 65 encrypts group information with a shared key (step S607). The third transmitter 67 transmits the encrypted device information and the encrypted group information to the second management apparatus 20-2 (step S608).

Thereafter, the third receiver 68 receives a notification from the second management apparatus 20-2 (step S609). The third receiver 68 determines whether the received notification is a finish notification or a failure notification (step S610). When the received notification is a finish notification (Yes at step S610), the third transmitter 67 transmits a finish notification to the first management apparatus 20-1 (step S611), and ends the present flow. When the received notification is a failure notification (No at step S610), the third transmitter 67 transmits a failure notification to the first management apparatus 20-1 (step S612), and ends the present flow.

As described above, the communication system 10 according to the present embodiment transmits determination information to check the information held by the devices 30 to the devices 30, and determines whether the management information moved from the first management apparatus 20-1 to the second management apparatus 20-2 through the server 40 is right, based on the determination results. With this, the communication system 10 according to the present embodiment enables easy check as to whether the management information moved from the first management apparatus 20-1 to the second management apparatus 20-2 is right. Accordingly, the communication system 10 according to the present embodiment enables easy execution of transfer of management authority from the first management apparatus 20-1 to the second management apparatus 20-2 via the server 40.

In the first embodiment, the server 40 may generate determination information in addition to the management information, to examine the management information, and transmit the information to the second management apparatus 20-2. This structure removes the necessity for the second management apparatus 20-2 to generate determination information, and simplifies the structure and the processing.

Second Embodiment

Figure 21:
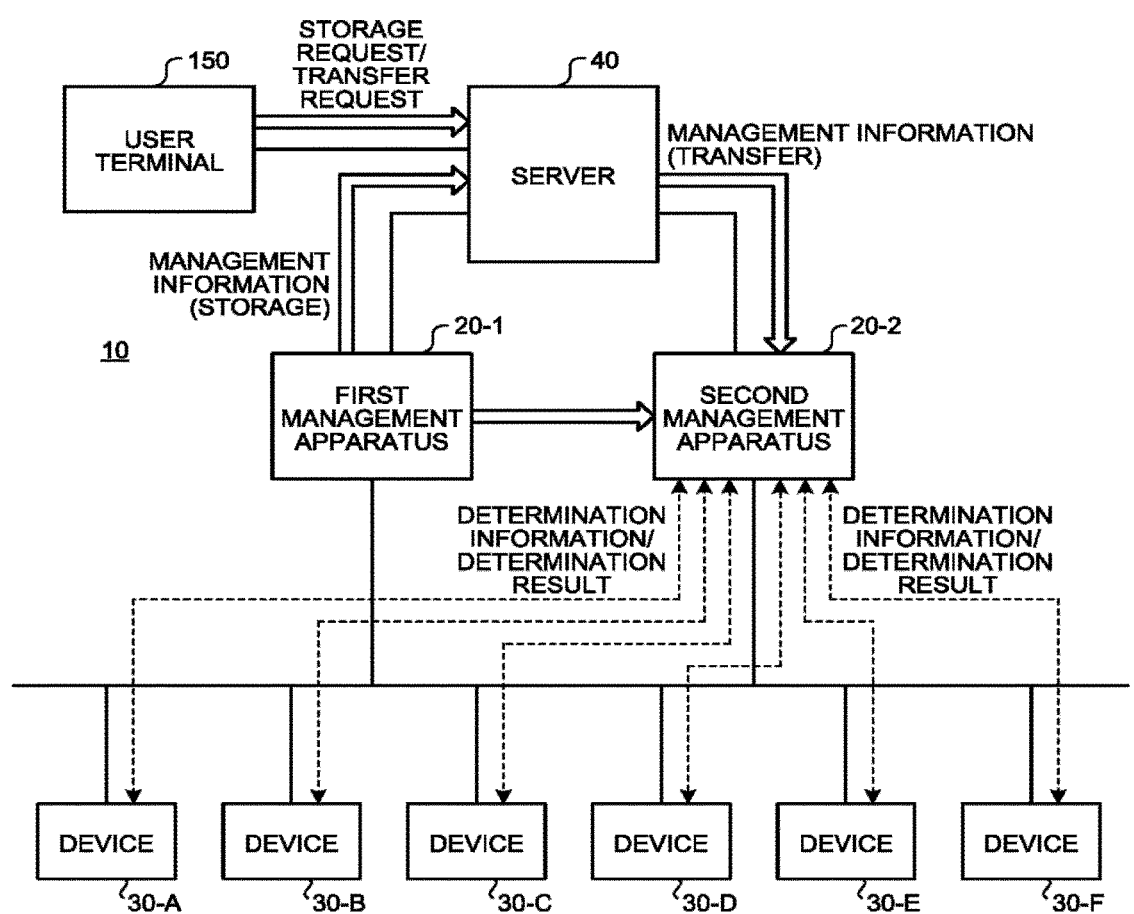
FIG. 21 is a diagram illustrating a flow of a process of management authority transfer in a second embodiment.

FIG. 21 is a diagram illustrating a flow of a process in the case where management authority is transferred in a second embodiment. The communication system 10 according to the second embodiment has substantially the same structure as the structure of the communication system 10 according to the first embodiment explained with reference to FIG. 1 to FIG. 20, and explanation thereof is omitted except the following differences.

The communication system 10 according to the second embodiment further includes a user terminal 150. The user terminal 150 is an information processing apparatus disposed on the network, and operated by the user. As an example, the user terminal 150 may be a personal computer, a notebook computer, a smartphone, a tablet, or the like. The user terminal 150 is connectable with the server 40 via the network.

The user terminal 150 is capable of transmitting a storage request to the server 40 in response to a user's instruction. The storage request includes specification information of the first management apparatus 20-1. The specification information is information to specify the device, such as an apparatus ID and an address, but is not limited thereto. When a storage request is received, the server 40 transmits a request to transmit management information to the first management apparatus 20-1 having the apparatus ID included in the storage request. Thereafter, the first management apparatus 20-1 transmits management information to the server 40, in accordance with the transmission request from the server 40. As described above, in the communication system 10 according to the second embodiment, the server 40 transmits a storage request to thereby cause the first management apparatus 20-1 to start transmission of the management information for authority transfer, without directly operating the first management apparatus 20-1.

The user terminal 150 is also capable of transmitting a transfer request to the server 40, in response to a user's instruction. The transfer request includes specification information of the second management apparatus 20-2. The specification information is information to specify the device, such as an apparatus ID and an address, but is not limited thereto. When a transfer request is received, the server 40 transmits a request to start management authority transfer processing to the second management apparatus 20-2 having the apparatus ID included in the transfer request. Thereafter, the second management apparatus 20-2 starts reception of management information from the server 40, in accordance with the transfer process start request from the server 40. As described above, in the communication system 10 according to the second embodiment, the server 40 transmits a transfer request to thereby cause the second management apparatus 20-2 to start reception of the management information for authority transfer and start processing for authority transfer, without directly operating the second management apparatus 20-2.

Figure 22:
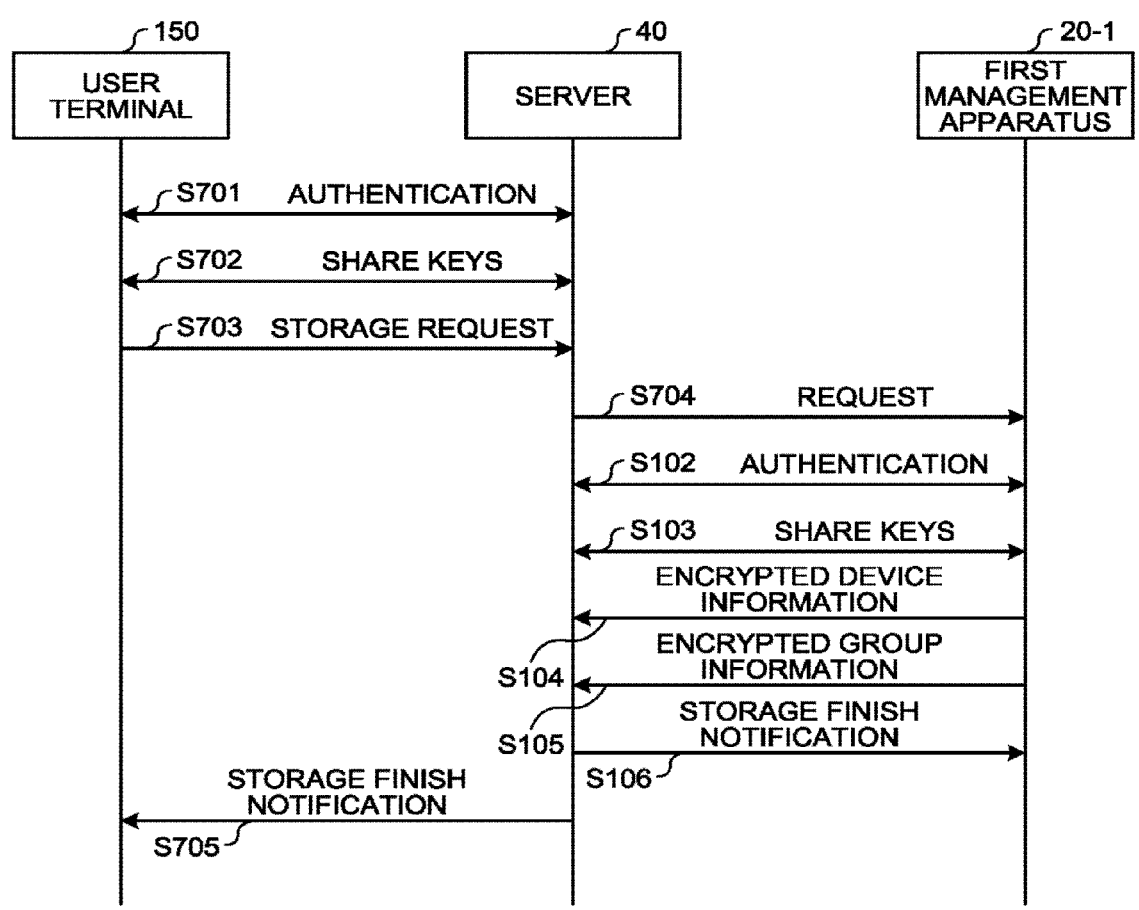
FIG. 22 is a sequence diagram illustrating a storage process sequence of a communication system according to a second embodiment.

FIG. 22 is a sequence diagram illustrating a storage process sequence for management authority transfer of the communication system 10 according to the second embodiment. The communication system 10 executes storage process for management authority transfer in accordance with the sequence illustrated in FIG. 22.

First, the user terminal 150 and the server 40 execute mutual authentication (step S701). When mutual authentication succeeds, the user terminal 150 and the server 40 mutually share keys (step S702). Thereafter, the user terminal 150 requests the server 40 to store management information to transfer management authority for the devices 30 (step S703).

When a storage request is received from the user terminal 150, the server 40 requests the first management apparatus 20-1 to store management authority for the devices 30 (step S704). Thereafter, the first management apparatus 20-1 and the server 40 execute the same process as the processes from step S102 to step S106 illustrated in FIG. 15. Thereafter, when the server 40 transmits a storage finish notification to the first management apparatus 20-1 (step S106), the server 40 transmits a storage finish notification to the user terminal 150 (step S705). In this way, the server 40 finishes the storage process of management information for management authority transfer.

Figure 23:
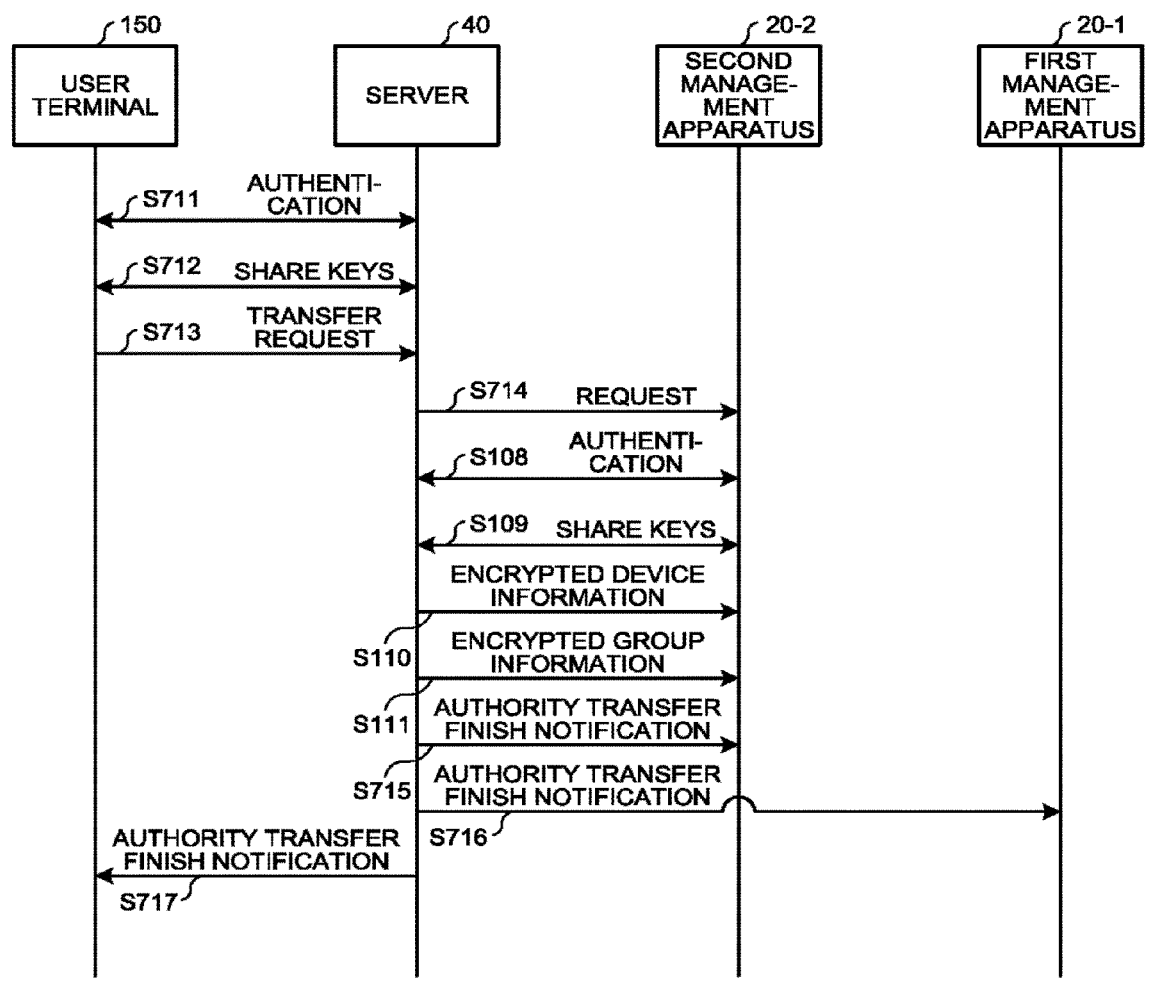
FIG. 23 is a sequence diagram illustrating a transfer process sequence of the communication system according to the second embodiment.

FIG. 23 is a sequence diagram illustrating a process sequence of management authority transfer of the communication system 10 according to the second embodiment. The communication system 10 executes processing for management authority transfer in accordance with the sequence illustrated in FIG. 23.

First, the user terminal 150 and the server 40 execute mutual authentication (step S711). When mutual authentication succeeds, the user terminal 150 and the server 40 mutually share keys (step S712). Thereafter, the user terminal 150 requests the server 40 to transfer management authority for the devices 30 (step S713).

When a management authority transfer request is received from the user terminal 150, the server 40 issues, to the second management apparatus 20-2, a request to transfer management authority for the devices 30 from the first management apparatus 20-1 to the second management apparatus 20-2 (step S714).

Thereafter, the second management apparatus 20-2 and the server 40 execute the same process as the processes from step S108 to step S111 illustrated in FIG. 15. Thereafter, when the server 40 transmits the encrypted device information and the group information to the second management apparatus 20-2 and transfer is finished, the server 40 transmits an authority transfer finish notification to the second management apparatus 20-2 (step S715).

Thereafter, the server 40 transmits an authority transfer finish notification to the first management apparatus 20-1 (step S716). The server 40 may not transfer an authority transfer finish notification to the first management apparatus 20-1. Thereafter, the server 40 transmits an authority transfer finish notification to the user terminal 150 (step S717). In this way, the server 40 ends the management authority transfer process.

Third Embodiment

Figure 24:
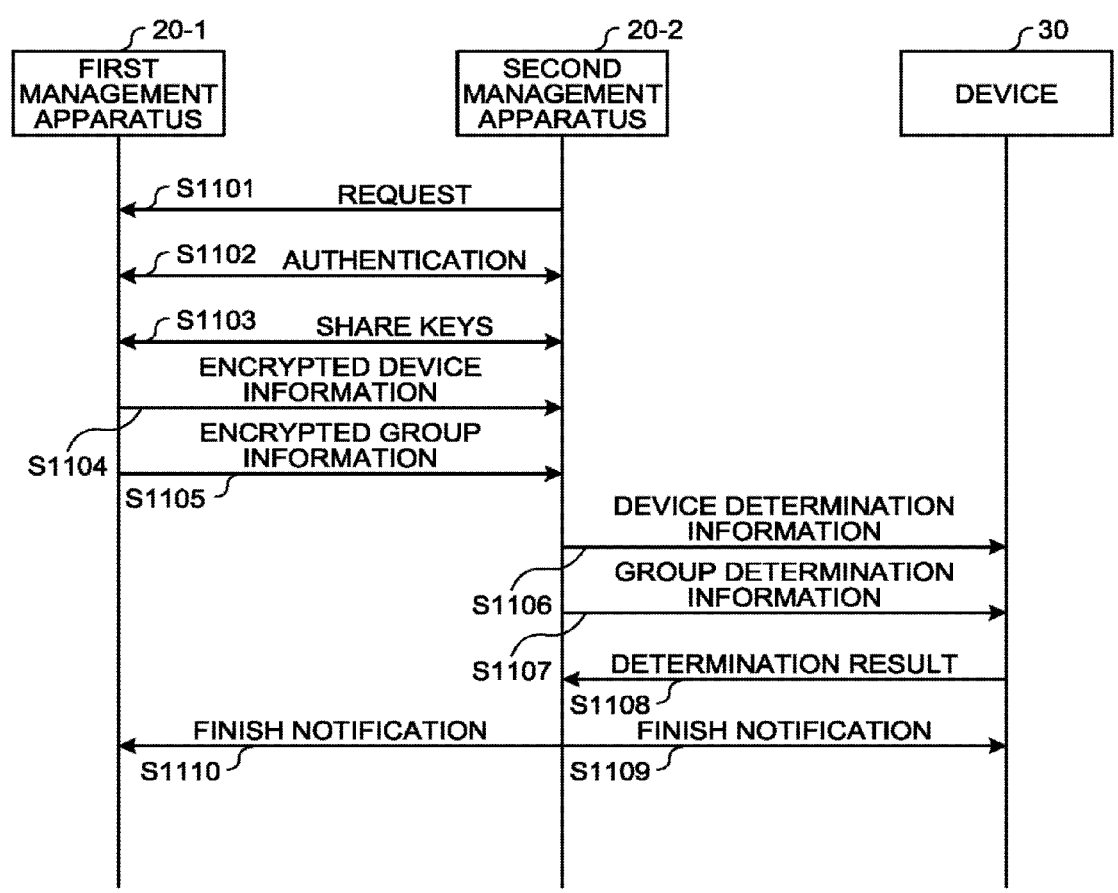
FIG. 24 is a sequence diagram illustrating a process sequence of a communication system according to a third embodiment.

FIG. 24 is a sequence diagram illustrating a process sequence of the communication system 10 according to the third embodiment. The communication system 10 according to the third embodiment has substantially the same structure as the structure of the communication system 10 according to the first embodiment explained with reference to FIG. 1 to FIG. 20 with the server 40 omitted therefrom, and explanation thereof is omitted except the following differences. The same is applicable to the fourth embodiment and subsequent embodiments.

The communication system 10 according to the third embodiment has a structure in which management information managed by the first management apparatus 20-1 is directly transmitted to the second management apparatus 20-2, without through the server 40. With this structure, the communication system 10 according to the third embodiment can achieve authority transfer process simply, without using the server 40.

Specifically, the communication system 10 executes management authority transfer process, in accordance with the sequence illustrated in FIG. 24. First, the second management apparatus 20-2 requests the first management apparatus 20-1 to transfer management authority for the devices 30 (step S1101). Thereafter, the first management apparatus 20-1 and the second management apparatus 20-2 execute mutual authentication (step S1102). When mutual authentication succeeds, the first management apparatus 20-1 and the second management apparatus 20-2 mutually share keys (step S1103).

When key sharing succeeds, the first management apparatus 20-1 encrypts device information with a shared key, and transmits the device information to the second management apparatus 20-2 (step S1104). Thereafter, the second management apparatus 20-2 receives the encrypted device information, and decrypts the device information. The first management apparatus 20-1 encrypts group information with a shared key, and transmits the group information to the second management apparatus 20-2 (step S1105). Thereafter, the second management apparatus 20-2 receives the encrypted group information, and decrypts the group information.

Thereafter, the second management apparatus 20-2 generates a device list from the decrypted device information, and generates device determination information based on the device list. The second management apparatus 20-2 transmits the device determination information to the devices 30 (step S1106). The second management apparatus 20-2 generates a group list from the decrypted group information, and generates group determination information based on the group list. The second management apparatus 20-2 transmits the group determination information to the devices 30 (step S1107).

Each of the devices 30 receives the device determination information, and determines whether the inspection value based on a pair of the device key held by the device 30 and the device identifier is included in the device list. The device 30 also receives the group determination information, and determines whether the inspection value based on a set of the group identifier for identifying the group to which the device 30 belongs, the group key, and the device identifier is included in the group list. The device 30 transmits a determination result to the second management apparatus 20-2 (step S1108).

The second management apparatus 20-2 determines whether the device information and the group information acquired from the first management apparatus 20-1 are right, based on determination results received from the devices 30. When it is determined that both the device information and the group information are right, the second management apparatus 20-2 operates as an apparatus having management authority thereafter. In addition, the second management apparatus 20-2 transmits a finish notification to each of the devices 30 (step S1109). In this manner, the devices 30 operate thereafter with recognition that the second management apparatus 20-2 is an apparatus having right management authority. The second management apparatus 20-2 also transmits a finish notification to the first management apparatus 20-1 (step S1110). In this manner, the first management apparatus 20-1 stops operating as an apparatus having management authority thereafter.

Fourth Embodiment

Figure 25:
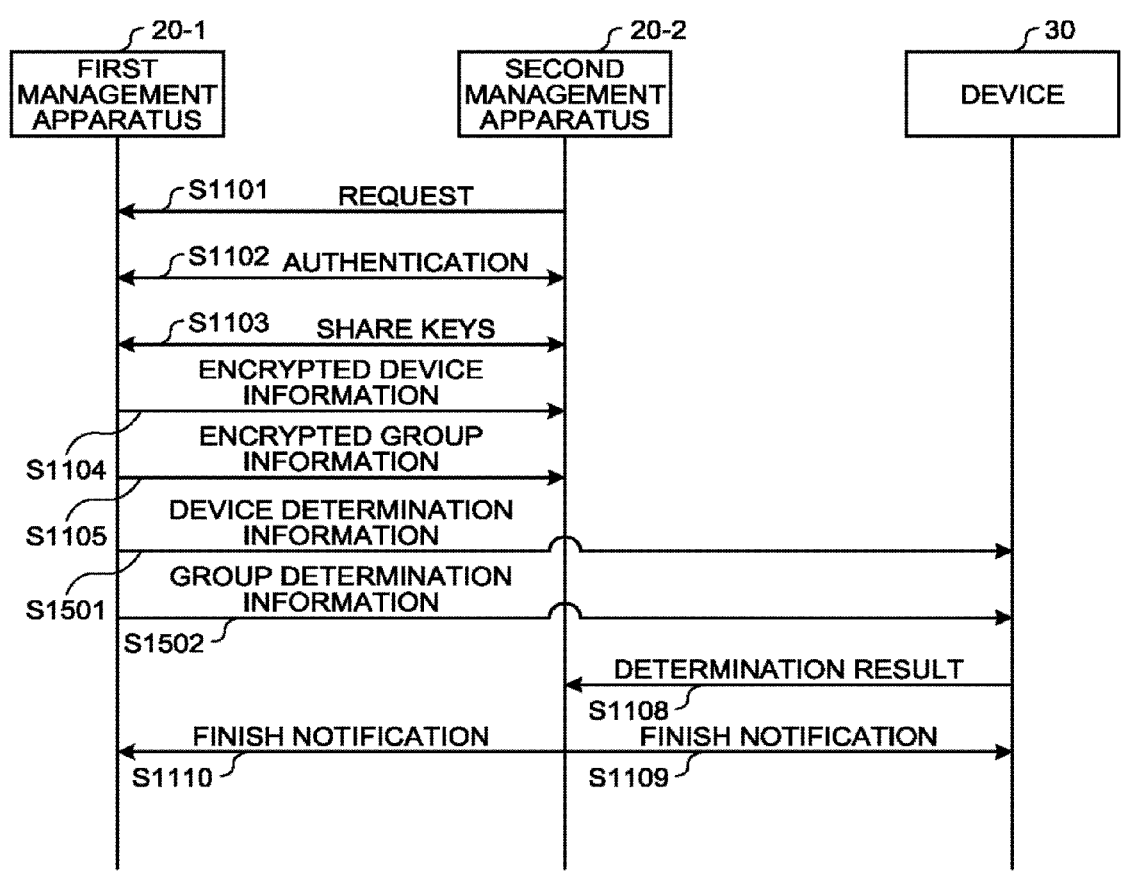
FIG. 25 is a sequence diagram illustrating a process sequence of a communication system according to a fourth embodiment.

FIG. 25 is a sequence diagram illustrating a process sequence of the communication system 10 according to a fourth embodiment.

The communication system 10 according to the fourth embodiment executes processing for management authority transfer in accordance with the sequence illustrated in FIG. 25. First, the communication system 10 according to the fourth embodiment executes the processes from step S1101 to step S1105, in the same manner as the third embodiment.

Thereafter, the first management apparatus 20-1 generates a device list from the device information, and generates device determination information based on the device list. The first management apparatus 20-1 transmits the device determination information to the devices 30 (step S1501). The first management apparatus 20-1 also generates a group list from the group information, and generates group determination information based on the group list. The first management apparatus 20-1 transmits the group determination information to the devices 30 (step S1502).

Each of the devices 30 receives the device determination information from the first management apparatus 20-1, and determines whether the inspection value based on a pair of the device key held by the device 30 and the device identifier is included in the device list. The device 30 also receives the group determination information from the first management apparatus 20-1, and determines whether the inspection value based on a set of the group identifier for identifying the group to which the device 30 belongs, the group key, and the device identifier is included in the group list.

Thereafter, the communication system 10 executes the processes from step S1108 to step S1110, in the same manner as the third embodiment.

In the communication system 10 according to the fourth embodiment, instead of the second management apparatus 20-2, the first management apparatus 20-1 generates and transmits device determination information and group determination information to the devices 30. With this structure, the communication system 10 according to the fourth embodiment prevents transmission of determination information by an illegal device.

Fifth Embodiment

Figure 26:
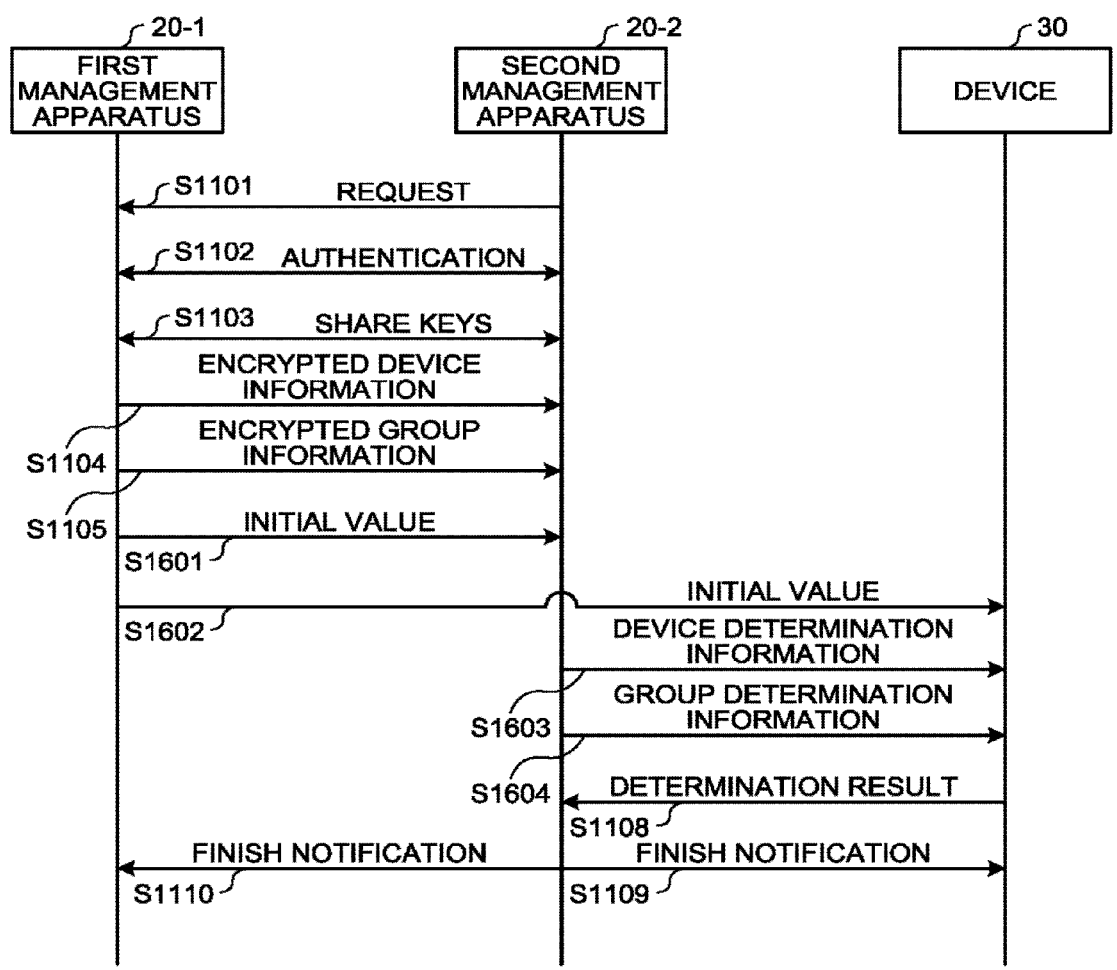
FIG. 26 is a sequence diagram illustrating a process sequence of a communication system according to a fifth embodiment.

FIG. 26 is a sequence diagram illustrating a process sequence of the communication system 10 according to a fifth embodiment. The communication system 10 according to the fifth embodiment executes processing for management authority transfer in accordance with the sequence illustrated in FIG. 26.

First, the communication system 10 according to the fifth embodiment executes the processes from step S1101 to step S1105, in the same manner as the third embodiment. Thereafter, the first management apparatus 20-1 generates an initial value, and transmits the initial value to the second management apparatus 20-2 (step S1601). Thereafter, the first management apparatus 20-1 transmits the same value as the initial value transmitted to the second management apparatus 20-2 to each of the devices 30 (step S1602).

The second management apparatus 20-2 generates a device list from the decrypted device information, and generates device determination information based on the device list. In this case, the second management apparatus 20-2 generates device determination information based on the initial value received from the first management apparatus 20-1. For example, when the device determination information is a bloom filter, the second management apparatus 20-2 generates a bit string by inputting the inspection values and the initial value to the hash functions. The second management apparatus 20-2 transmits the device determination information generated as described above to the devices 30 (step S1603).

The second management apparatus 20-2 also generates a group list from the decrypted group information, and generates group determination information based on the group list. In this case, the second management apparatus 20-2 generates group determination information based on the initial value received from the first management apparatus 20-1. For example, when the group determination information is a bloom filter, the second management apparatus 20-2 generates a bit string by inputting the inspection values and the initial value to the hash functions. The second management apparatus 20-2 transmits the group determination information generated as described above to the devices 30 (step S1604).

Each of the devices 30 receives the device determination information, and determines whether the inspection value based on a pair of the device key held by the device 30 and the device identifier is included in the device list. In this case, the device 30 executes determination based on the initial value received from the first management apparatus 20-1. For example, when the device determination information is a bloom filter, the device 30 calculates digit positions of the bit string by inputting the inspection values and the initial value to the hash functions.

The device 30 also receives the group determination information, and determines whether the inspection value based on a set of the group identifier for identifying the group to which the device 30 belongs, the group key, and the device identifier is included in the group list. In this case, the device 30 executes determination based on the initial value received from the first management apparatus 20-1. For example, when the group determination information is a bloom filter, the device 30 calculates digit positions of the bit string by inputting the inspection values and the initial value to the hash functions.

Thereafter, each device 30 and the second management apparatus 20-2 execute the processes from step S1108 to step S1110, in the same manner as the third embodiment. In the fifth embodiment, the first management apparatus 20-1 transmits the initial value for generating the device determination information and the group determination information to the second management apparatus 20-2 and the devices 30. With this structure, the communication system 10 according to the fifth embodiment prevents transmission of determination information by an illegal device.

The initial value is, for example, a random number. Alternatively, the initial value may be a value with low possibility that the same value is selected, such as time information or the sequence number. With this structure, the first management apparatus 20-1 is enabled to generate an initial value different from the initial value generated in the past, and prevents improper use of determination information generated in the past.

Sixth Embodiment

Figure 27:
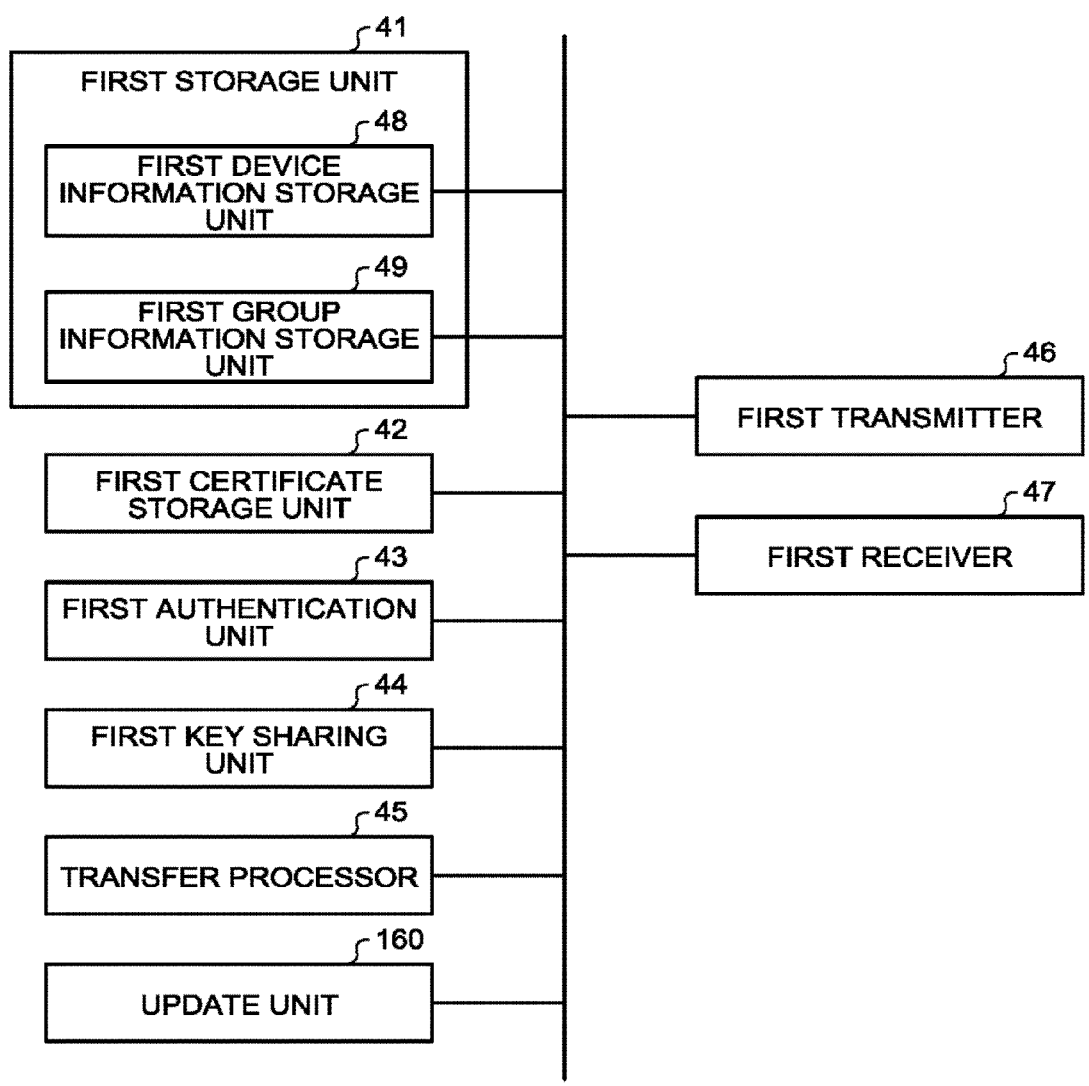
FIG. 27 is a diagram illustrating a configuration of a management apparatus according to a sixth embodiment.

FIG. 27 is a diagram illustrating a configuration of the management apparatus 20 according to a sixth embodiment. The management apparatus 20 according to the sixth embodiment further includes an update unit 160. The update unit 160 causes each device 30 to update information held by the device 30, after it is checked that the information stored in the first storage unit 41 is right. In the present embodiment, the update unit 160 generates update information for updating the device keys and the group keys held by the devices 30, and transmits the update information to each device 30.

Figure 28:
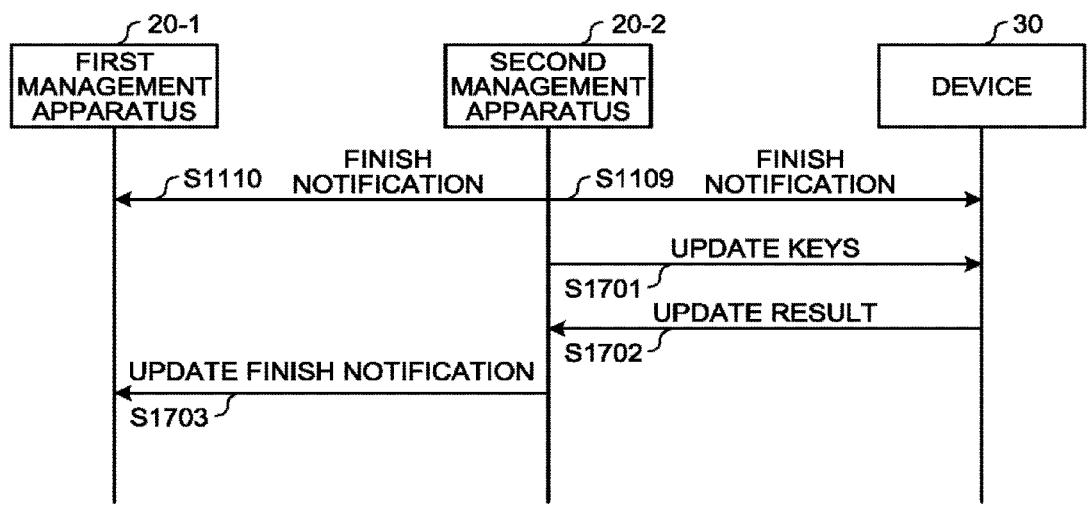
FIG. 28 is a sequence diagram illustrating a process sequence of a communication system according to the sixth embodiment.

FIG. 28 is a sequence diagram illustrating a process sequence of the communication system 10 according to the sixth embodiment. The communication system 10 according to the sixth embodiment executes processing for management authority transfer in accordance with the sequence illustrated in FIG. 28.

First, the communication system 10 according to the sixth embodiment executes the processes up to Step S1110, in the same manner as the third embodiment. Thereafter, the second management apparatus 20-2 generates update information for updating the device keys and the group keys. The second management apparatus 20-2 transmits the update information to the respective devices 30 (step S1701).

Each device 30 updates the device keys and the group keys held the device 30, based on the received update information. When the device 30 finishes update, the device 30 transmits an update result to the second management apparatus 20-2 (step S1702). When the second management apparatus 20-2 receives update results indicating that update is normally finished from all the devices 30, the second management apparatus 20-2 transmits an update finish notification to the first management apparatus 20-1 (step S1703).

According to the communication system 10 of the sixth embodiment as described above, the device keys and the group keys are updated after management authority transfer is finished, and prevents improper use of the device keys and the group keys remaining in the first management apparatus 20-1 after transfer of the management authority.

Hardware Configuration

Figure 29:
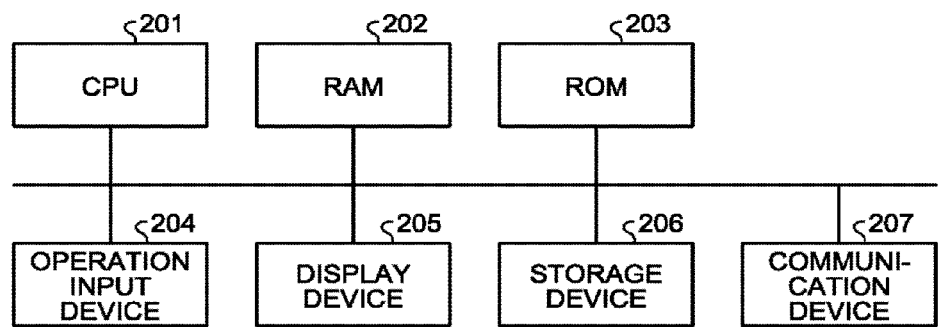
FIG. 29 is a diagram illustrating hardware configuration of the management apparatus.

FIG. 29 is a diagram illustrating an example of hardware configuration of the management apparatus 20 according to the embodiment. The management apparatus 20 according to the present embodiment is implemented by an information processing apparatus having, for example, the hardware configuration as illustrated in FIG. 29. The devices 30 and the server 40 are also implemented by information processing apparatuses having hardware configuration similar to that of the management apparatus 20.

The information processing apparatus includes a CPU 201, a random access memory (RAM) 202, a read only memory (ROM) 203, an operation input device 204, a display device 205, a storage device 206, and a communication device 207. These units are connected through a bus.

The CPU 201 is a processor to execute arithmetic processing and control processing and the like in accordance with computer programs. The CPU 201 executes various processes in cooperation with computer programs stored in the ROM 203 and the storage device 206 or the like, with a predetermined area of the RAM 202 used as a work area.

The RAM 202 is a memory such as a synchronous dynamic random access memory (SDRAM). The RAM 202 functions as a work area of the CPU 201. The ROM 203 is a memory storing therein computer programs and various types of information in a non-rewritable manner.

The operation input device 204 is an input device such as a mouse and a keyboard. The operation input device 204 receives information input by a user's operation as an instruction signal, and outputs the instruction signal to the CPU 201.

The display device 205 is a display device such as a liquid crystal display (LCD). The display device 205 displays various types of information, based on a display signal from the CPU 201.

The storage device 206 is a device to write and read data to and from a storage medium formed of a semiconductor such as a flash memory, or a magnetically or optically recordable storage medium. The storage device 206 writes and reads data to and from a storage medium, in accordance with control from the CPU 201. The communication device 207 communicates with an external device via a network, in accordance with control from the CPU 201.

The computer program executed in the management apparatus 20 of the present embodiment has a module structure including a first authentication module, a first key sharing module, a transfer processing module, a first transmission module, and a first reception module. The transfer processing module includes a request transmission module, a second encryption module, a request reception module, a second decryption module, a list generation module, a determination information generation module, a transmission module, a result acquisition module, and a check module. The computer program is loaded and executed on the RAM 202 with the CPU 201 (processor), to cause the information processing apparatus to function as the first authentication unit 43, the first key sharing unit 44, the transfer processor 45 (the request transmitter 81, the second encryption unit 82, the request receiver 83, the second decryption unit 84, the list generator 85, the determination information generator 86, the transmitter 87, the result acquisition unit 88, and the check unit 89), the first transmitter 46, and the first receiver 47.

The management apparatus 20 is not limited to such a configuration, but may have a structure in which at least part of the first authentication unit 43, the first key sharing unit 44, the transfer processor 45 (the request transmitter 81, the second encryption unit 82, he request receiver 83, the second decryption unit 84, the list generator 85, the determination information generator 86, transmitter 87, the result acquisition unit 88, and the check unit 89), the first transmitter 46, and the first receiver 47 is implemented by a hardware circuit (such as a semiconductor integrated circuit).

The computer program executed in each device 30 of the present embodiment has a module structure including a second authentication module, a second key sharing module, a determination module, a second transmission module, and a second reception module. The determination module includes a reception module, an inspection value generation module, a determination execution module, an examination module, and a result transmission module. The computer program is loaded and executed on the RAM 202 with the CPU 201 (processor), to cause the information processing apparatus to function as the second authentication unit 53, the second key sharing unit 54, the determination unit 55 (the receiver 101, the inspection value generator 102, the determination execution unit 103, the examination unit 104, and the result transmitter 105), the second transmitter 56, and the second receiver 57.

Each of the devices 30 is not limited to such a configuration, but may have a structure in which at least part of the second authentication unit 53, the second key sharing unit 54, the determination unit 55 (the receiver 101, the inspection value generator 102, the determination execution unit 103, the examination unit 104, and the result transmitter 105), the second transmitter 56, and the second receiver 57 with a hardware circuit (such as a semiconductor integrated circuit).

The computer program executed in the server 40 of the present embodiment has a module structure including a third authentication module, a third key sharing module, a first encryption module, a first decryption module, a third transmission module, and a third reception module. The computer program is loaded and executed on the RAM 202 with the CPU 201 (processor), to cause the information processing apparatus to function as the third authentication unit 63, the third key sharing unit 64, the first encryption unit 65, the first decryption unit 66, the third transmitter 67, and the third receiver 68.

The server 40 is not limited to such a configuration, but may have a structure in which at least part of the third authentication unit 63, the third key sharing unit 64, the first encryption unit 65, the first decryption unit 66, the third transmitter 67, and the third receiver 68 with a hardware circuit (such as a semiconductor integrated circuit).

The computer program executed in the management apparatus 20 of the present embodiment is a file of a form that can be installed or executed in a computer, and stored and provided in a computer-readable recording medium, such as a CD-ROM, a flexible disk, a CD-R, and a digital versatile disc (DVD).

The computer program executed in the management apparatus 20 of the present embodiment may be configured to be stored on a computer connected to a network such as the Internet, and provided by being downloaded through the network. In addition, the computer program executed in the management apparatus 20 of the present embodiment may be configured to be provided or distributed through a network such as the Internet. The computer program executed in the management apparatus 20 may also be configured to be incorporated in advance in a ROM or the like and provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management apparatus that manages pieces of information held by a plurality of devices, the management apparatus comprising:
a storage configured to store therein the pieces of information held by the devices;
one or more processors; and
a transmitter, wherein
the processors are configured to:
generate a list of inspection values indicating the pieces of information stored in the storage; and
generate determination information including values of all digits of a bit string included in a first bloom filter based on the list;
the transmitter is configured to:
transmit the determination information to the respective devices;
acquire, from each of the devices, a determination result obtained by determining whether the inspection value indicating the information held by the device is included in the list based on the determination information; and
based on determination results acquired from the respective devices, check whether the pieces of information stored in the storage are right information or not right information;
wherein the storage stores therein device information including pieces of information individually held by the respective devices and stores therein group information including information held in common by devices belonging to a group,
the processors:
generate a device list serving as the list of the inspection values indicating the device information stored in the storage;
generate a group list serving as the list of the inspection values indicating the group information stored in the storage;

generate device determination information including values of all digits of a bit string included in a second bloom filter based on the device list; and
generate group determination information including values of all digits of a bit string included in a third bloom filter based on the group list, and
the transmitter transmits the device determination information and the group determination information to the respective devices as the determination information.

2. The apparatus according to claim 1, wherein, when the determination results each indicating that the inspection value indicating the information held by the device is included in the list are acquired from a predetermined number or more of devices, the processors determine that the pieces of information stored in the storage are right information or not right information.

3. The apparatus according to claim 1, wherein the determination information has a determination with a possibility of false positive, but without possibility of false negative, the false positive representing an erroneous determination that information not included in the list is determined as being included in the list, and the false negative representing an erroneous determination that information included in the list is determined as being not included in the list.

4. The apparatus according to claim 3, wherein the processors generate the determination information with the possibility of false positive set within a preset range.

5. The apparatus according to claim 1, wherein
the device information is information including device keys assigned to the respective devices; and the group information is information including group keys held in common by devices belonging to respective groups.

6. The apparatus according to claim 5, wherein
the processors generate the inspection values based on pairs of device identifiers for identifying the devices and the device keys, for each pair of the device and the device key, and generate the device list by listing the generated inspection values, and
the processors generate the inspection values based on sets of group identifiers for identifying the groups, the group keys, and the device identifiers, for each pair of the group and the device, and generate the group list by listing the generated inspection values.

7. The apparatus according to claim 1, wherein the determination information is the first bloom filter.

8. The apparatus according to claim 7, wherein the processors generate a plurality of initial values, and input pairs of the initial values and the inspection values included in the list to a predetermined single hash function, to generate the bit string included in the first bloom filter.

9. The apparatus according to claim 1, wherein the transmitter adds a signature to the determination information, and transmits the determination information to the respective devices.

10. A computer program product comprising a computer-readable medium containing a non-transitory computer program that causes an information processing apparatus to function as the management apparatus according to claim 1.

11. A system comprising:
a first management apparatus;
a second management apparatus; and
a plurality of devices that are connectable through a network, wherein
the first management apparatus comprises:
a storage configured to store therein pieces of information held by the devices; and
one or more first processors configured to encrypt the pieces of information held by the devices and stored in the storage, and transmit the encrypted information to the second management apparatus,
the second management apparatus comprises:
one or more second processors; and
a second transmitter, wherein
the second processors are configured to:
receive and decrypt the encrypted pieces of information held by the devices and stored in the storage from the first management apparatus;
generate a list of inspection values indicating the pieces of information stored in the storage; and
generate determination information including values of all digits of a bit string included in a first bloom filter based on the list;
the second transmitter transmits the determination information to the respective devices; and
the second processors are further configured to:
acquire, from each of the devices, a determination result obtained by determining, based on the determination information, whether the inspection value indicating the information held by the device is included in the list; and
based on determination results acquired from the respective devices, check whether the pieces of information stored in the storage are right information or not right information;
wherein the storage stores therein device information including pieces of information individually held by the respective devices and stores therein group information including information held in common by devices belonging to a group,
the second processors:
generate a device list serving as the list of the inspection values indicating the device information stored in the storage;
generate a group list serving as the list of the inspection values indicating the group information stored in the storage;
generate device determination information including values of all digits of a bit string included in a first second bloom filter based on the device list; and
generate group determination information including values of all digits of a bit string included in a second third bloom filter based on the group list, and
the transmitter transmits the device determination information and the group determination information to the respective devices as the determination information.

12. The system according to claim 11, wherein the first processors encrypt part of the pieces of information held by the devices and stored in the storage, and transmit the part of the pieces of information to the second management apparatus.

13. The system according to claim 11, wherein the second transmitter multicasts the determination information to the devices connected to the network.

14. The system according to claim 11, wherein the second processors are further configured to cause each device to update the information held by the device, after the second processors check that the information stored in the storage is right information or not right information.

15. The system according to claim 11, wherein
the first management apparatus further comprises a first transmitter,
the first processors are further configured to:

generate a list of inspection values indicating the pieces of information stored in the storage; and generate the determination information including the values of all the digits of the bit string included in the first bloom filter based on the list; and the first transmitter is configured to transmit the determination information to the respective devices.

16. The system according to claim 15, wherein each of the devices comprises:

a receiver configured to receive the determination information;

one or more third processors configured to provide the inspection values indicating the held information to the determination information, and cause the determination information to determine whether the inspection values are included in the list; and a result transmitter configured to transmit a determined result obtained by the third processors, to the second management apparatus.

17. The system according to claim 16, wherein the third processors are further configured to examine the determination information.

18. The system according to claim 16, wherein the determination information is the first bloom filter, the first management apparatus generates an initial value, and provides the initial value to the first processors and the third processors, the first processors input the initial value acquired from the first management apparatus and the inspection values included in the list to a hash function, to generate a bit string of the first bloom filter, and the third processors input the initial value acquired from the first management apparatus and the inspection values indicating the held information to the hash function, to detect digit positions in the bit string of the first bloom filter.

19. A method executed in a management apparatus that manages pieces of information held by a plurality of devices, the management apparatus including storage configured to store therein the pieces of information held by the devices, the method comprising:

generating, by the management apparatus, a list of inspection values indicating the pieces of information stored in the storage;

generating, by the management apparatus, determination information including values of all digits of a bit string included in a first bloom filter based on the list;

transmitting, by the management apparatus, the determination information to the respective devices;

acquiring, by the management apparatus, from each of the devices, a determination result obtained by determining whether the inspection value indicating the information held by the device is included in the list based on the determination information; and based on determination results acquired from the respective devices, checking, by the management apparatus, whether the pieces of information stored in the storage are right information or not right information;

wherein the storage stores therein device information including pieces of information individually held by the respective devices and stores therein group information including information held in common by devices belonging to a group, generating, by the management apparatus, a device list serving as the list of the inspection values indicating the device information stored in the storage;

generating, by the management apparatus, e a group list serving as the list of the inspection values indicating the group information stored in the storage;

generating, by the management apparatus, device determination information including values of all digits of a bit string included in a second bloom filter based on the device list; and generating, by the management apparatus, group determination information including values of all digits of a bit string included in a third bloom filter based on the group list, and the transmitter transmits the device determination information and the group determination information to the respective devices as the determination information.

* * * * *